(12) United States Patent
Lacour et al.

(10) Patent No.: US 6,387,311 B1
(45) Date of Patent: May 14, 2002

(54) MANUFACTURE OF A SUPPORT

(75) Inventors: Jean-Charles Lacour, Clermont-Ferrand; Didier Voisin, Bourbon-Lancy, both of (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/439,507

(22) Filed: Nov. 12, 1999

Related U.S. Application Data
(60) Provisional application No. 60/113,174, filed on Dec. 21, 1998.

(30) Foreign Application Priority Data
Nov. 12, 1998 (FR) .............................. 98 14243

(51) Int. Cl.[7] .............................................. B29C 45/14
(52) U.S. Cl. ........................... 264/229; 249/63; 249/83; 264/259; 264/275; 264/328.2; 264/334; 425/543; 425/577; 425/443
(58) Field of Search ................. 264/229, 318, 264/334, 259, 275, 328.2, 326; 249/63, 83; 425/543, 544, 577, DIG. 58, 438, 443

(56) References Cited
U.S. PATENT DOCUMENTS

| | | | |
|---|---|---|---|
| 3,813,197 A | | 5/1974 | Ray et al. |
| 3,865,529 A | * | 2/1975 | Guzzo ................. 425/DIG. 58 |
| 4,000,240 A | | 12/1976 | Green et al. |
| 4,378,928 A | * | 4/1983 | Kopp et al. .................... 249/63 |
| 4,676,732 A | * | 6/1987 | Letica .......................... 249/63 |
| 4,832,307 A | * | 5/1989 | Watanabe et al. ............. 249/63 |
| 5,700,415 A | * | 12/1997 | Hiroki et al. .................. 249/63 |
| 5,891,279 A | | 4/1999 | Lacour |

FOREIGN PATENT DOCUMENTS
EP      0721854      7/1996

* cited by examiner

Primary Examiner—Mathieu D. Vargot
(74) Attorney, Agent, or Firm—Baker Botts L.L.P.

(57) ABSTRACT

A mold and a method for manufacturing a support to be mounted on a rim of a vehicle by injection or transfer molding in which the molding material is force fed into a closed molding cavity. The mold includes an internal core for molding the inner surface of the support, upper and lower platens or shells for molding the body of the support and segments for molding the outer bearing surface. The mold includes a mechanism capable of imparting relative movement to the platens or shells which not only permits opening and closing of the mold but also ensures the specific movements of the core. The core includes at least three separable rigid parts: a center part and at least two complementary parts. The center part has two flat bearings, inclined at the same angle relative to the axis of the mold. These flat bearings are designed to cooperate with corresponding bearings arranged on each of the complementary parts to place the mold in a molding condition or in a stripping condition.

12 Claims, 27 Drawing Sheets

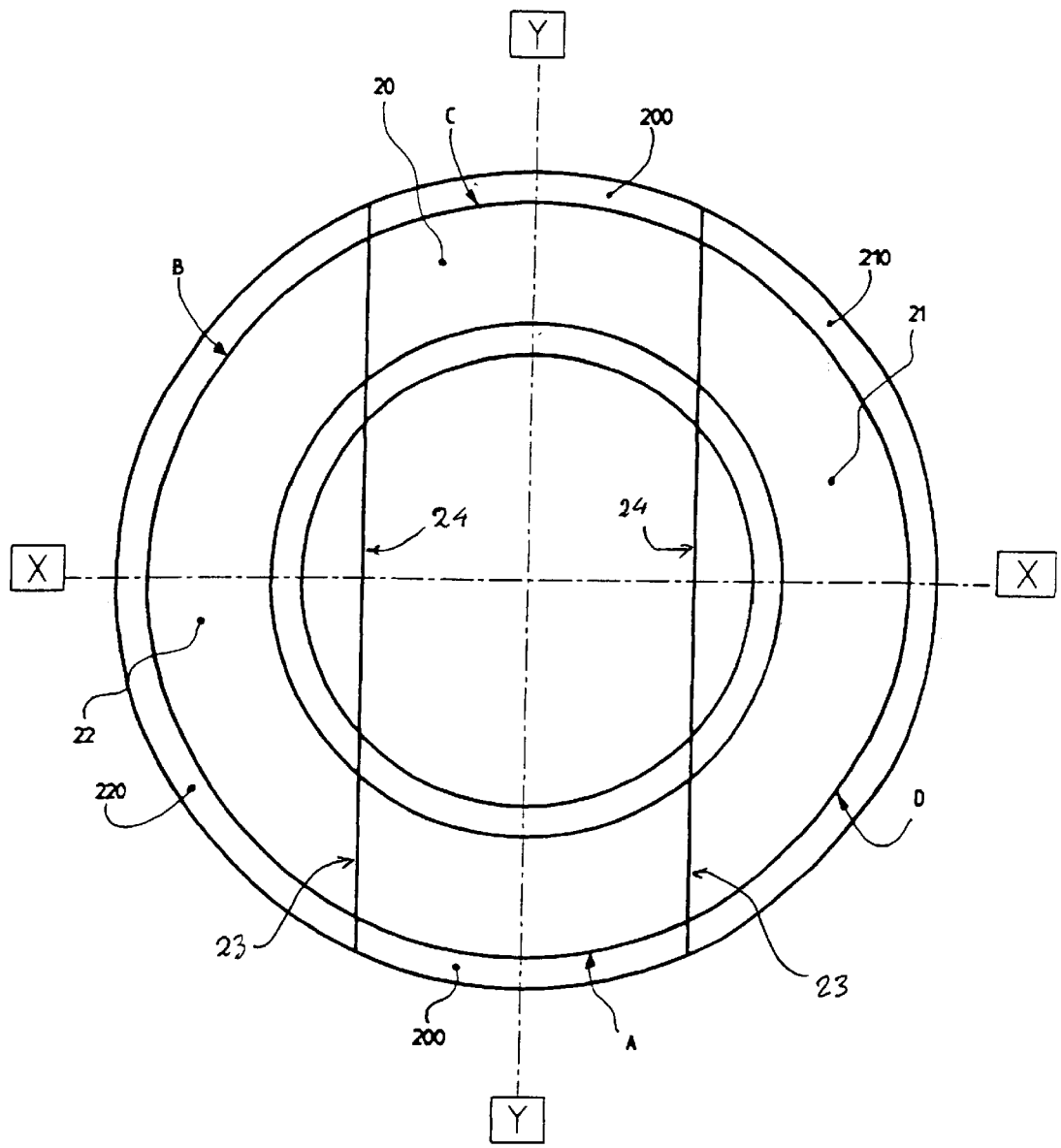

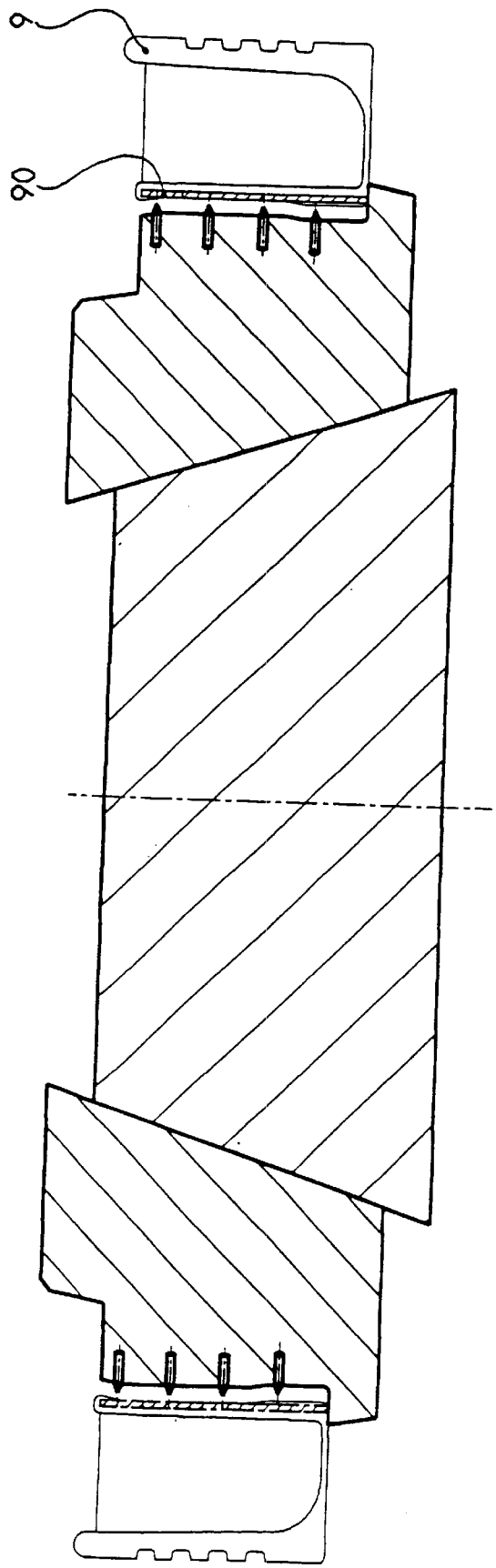
FIGURE 4x0

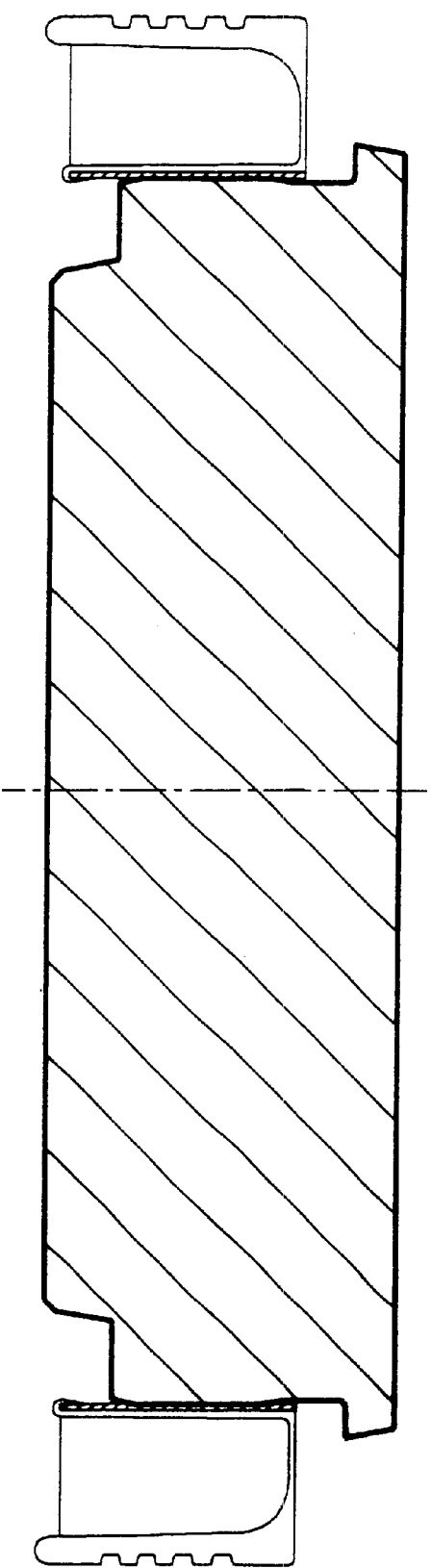

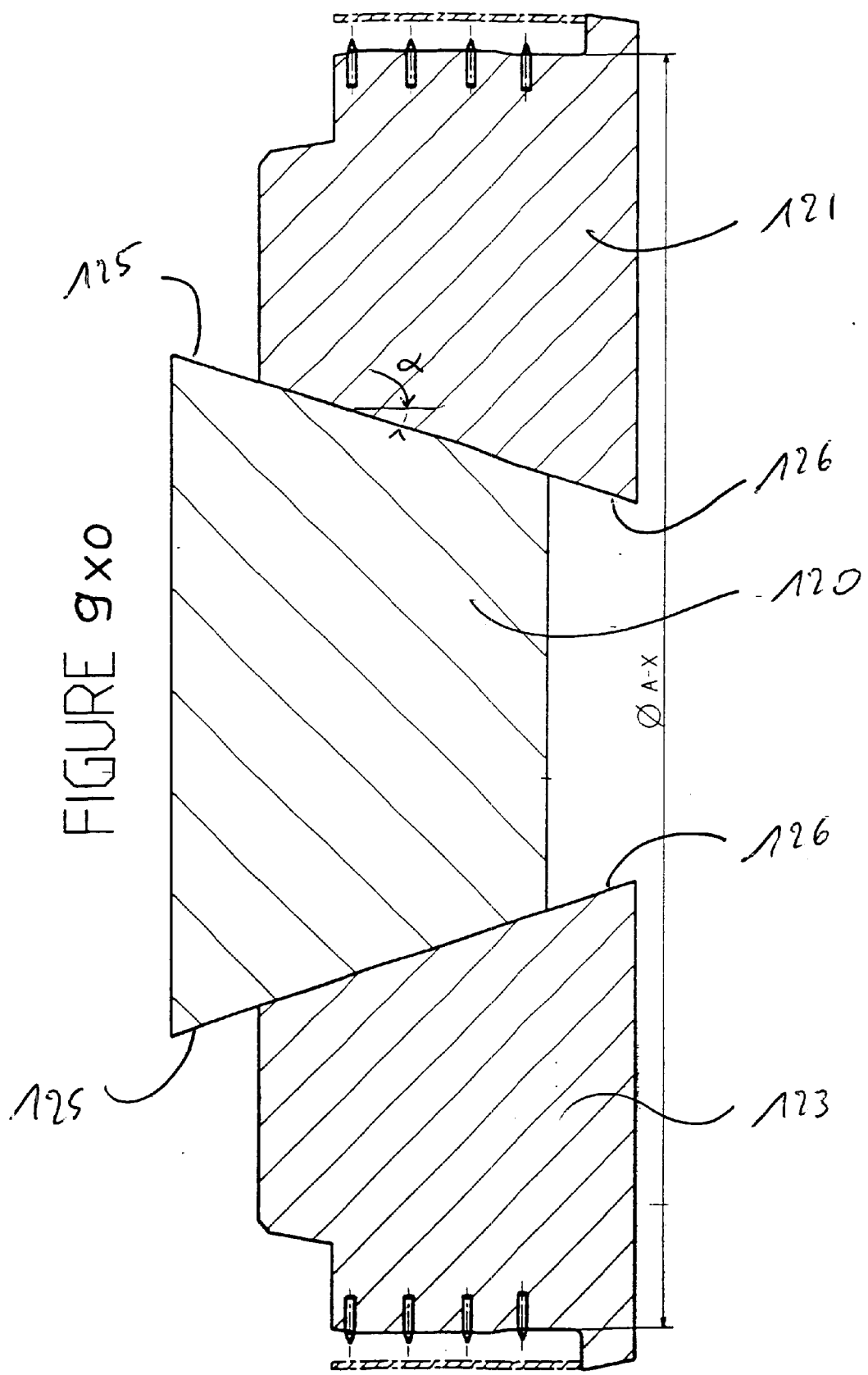

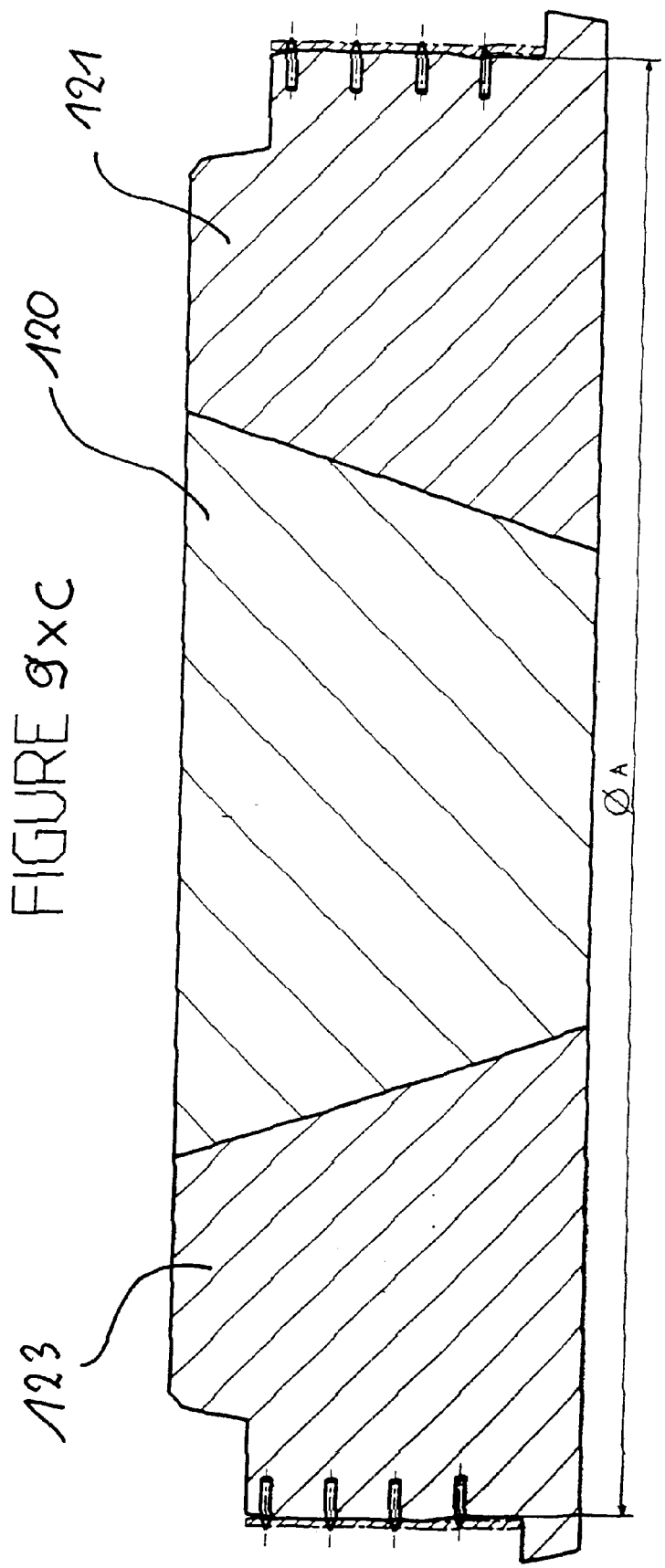

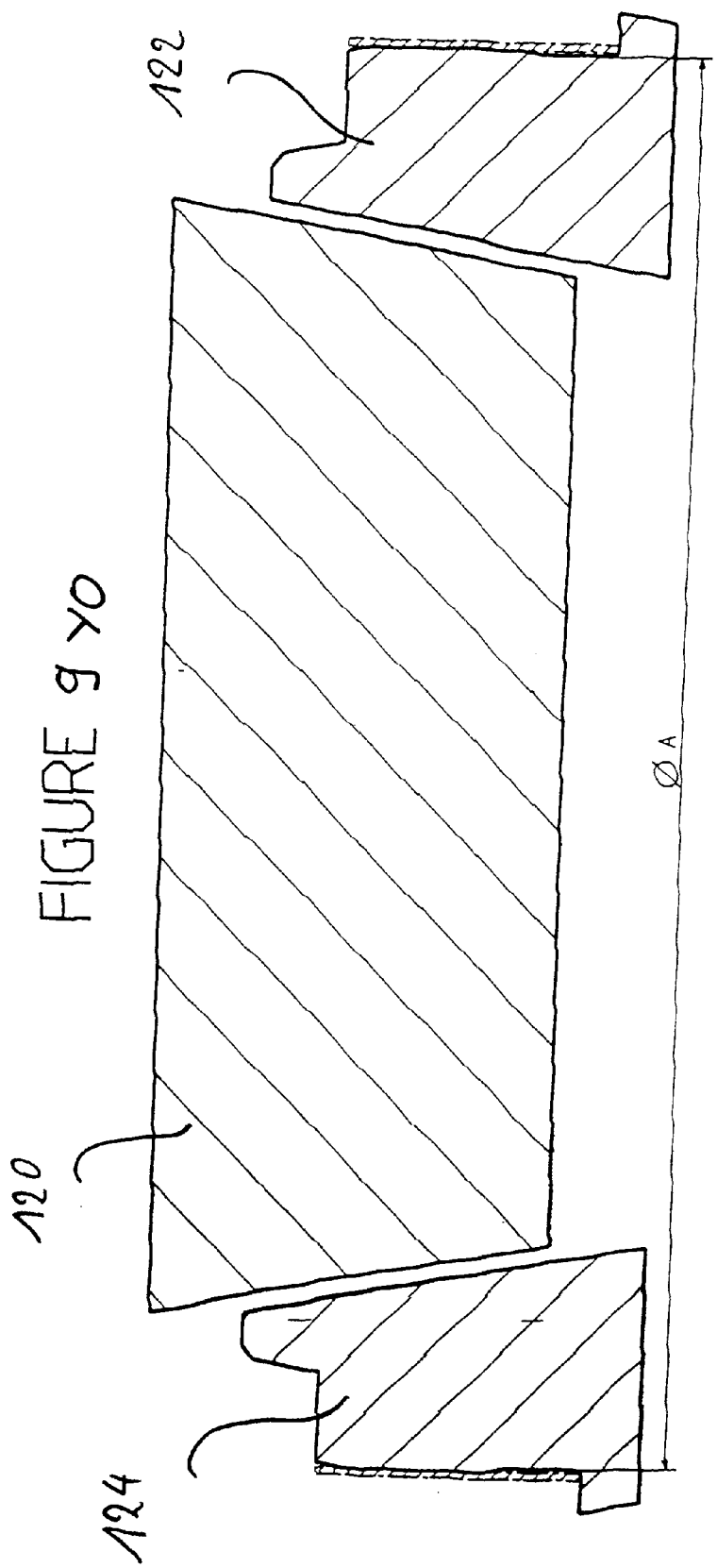

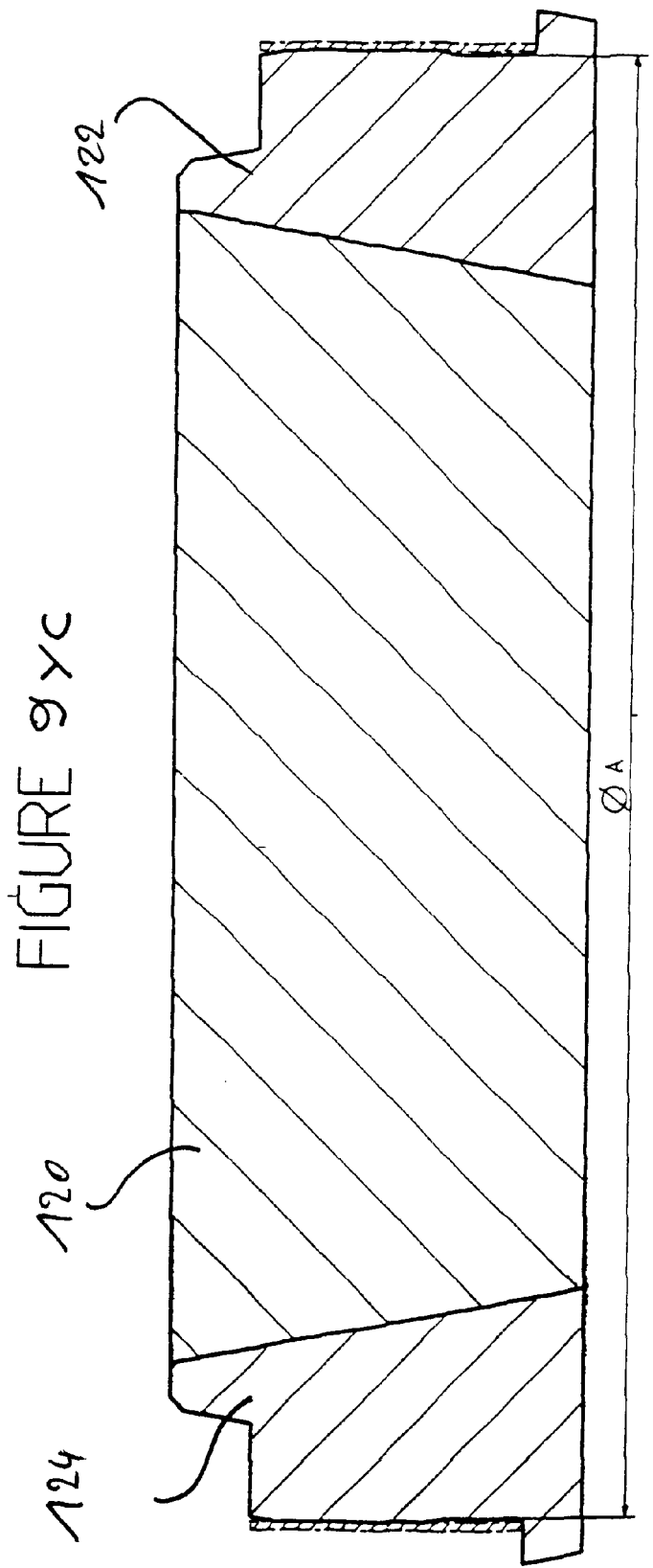

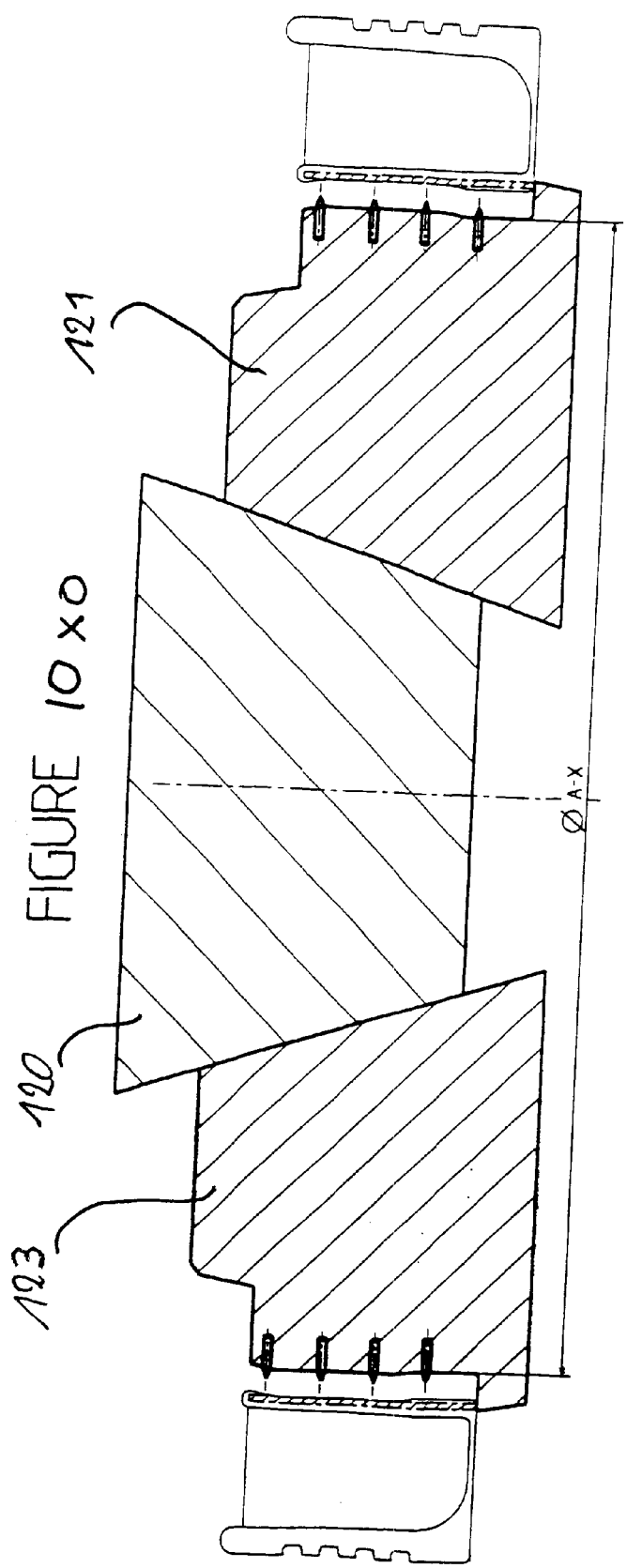

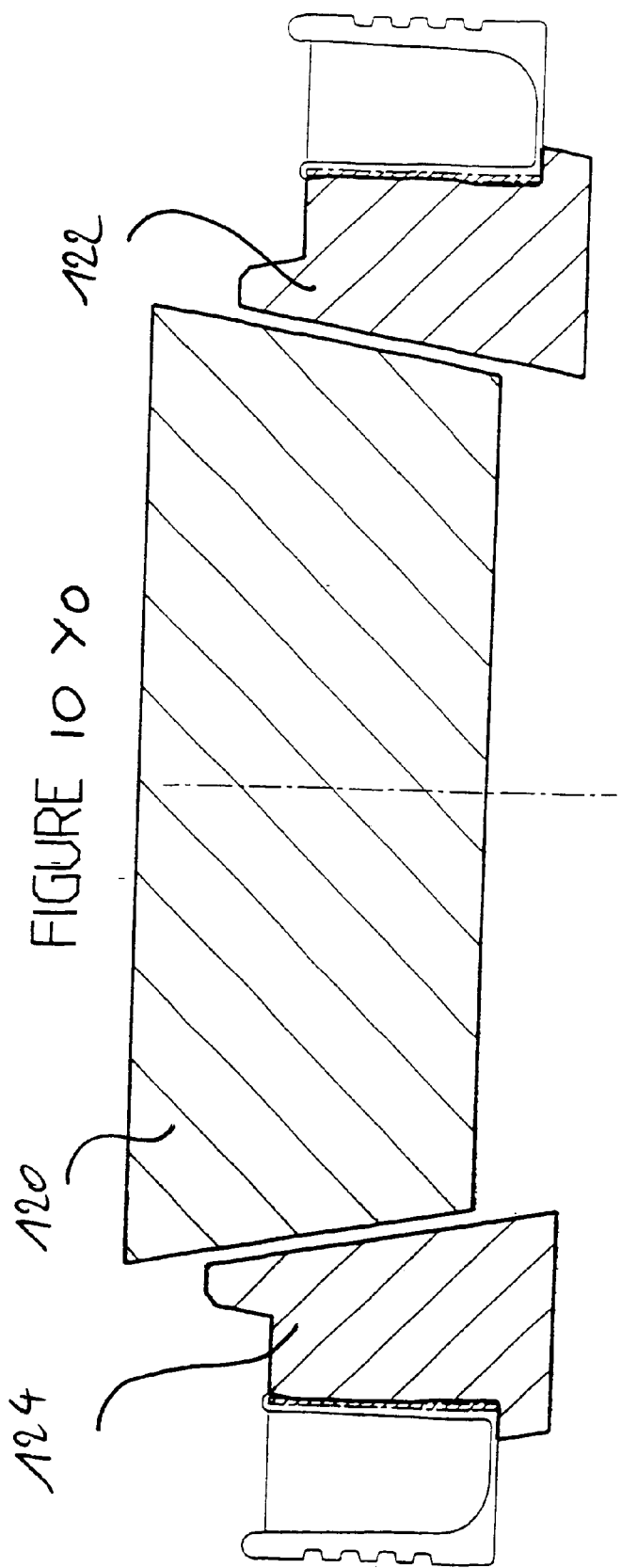

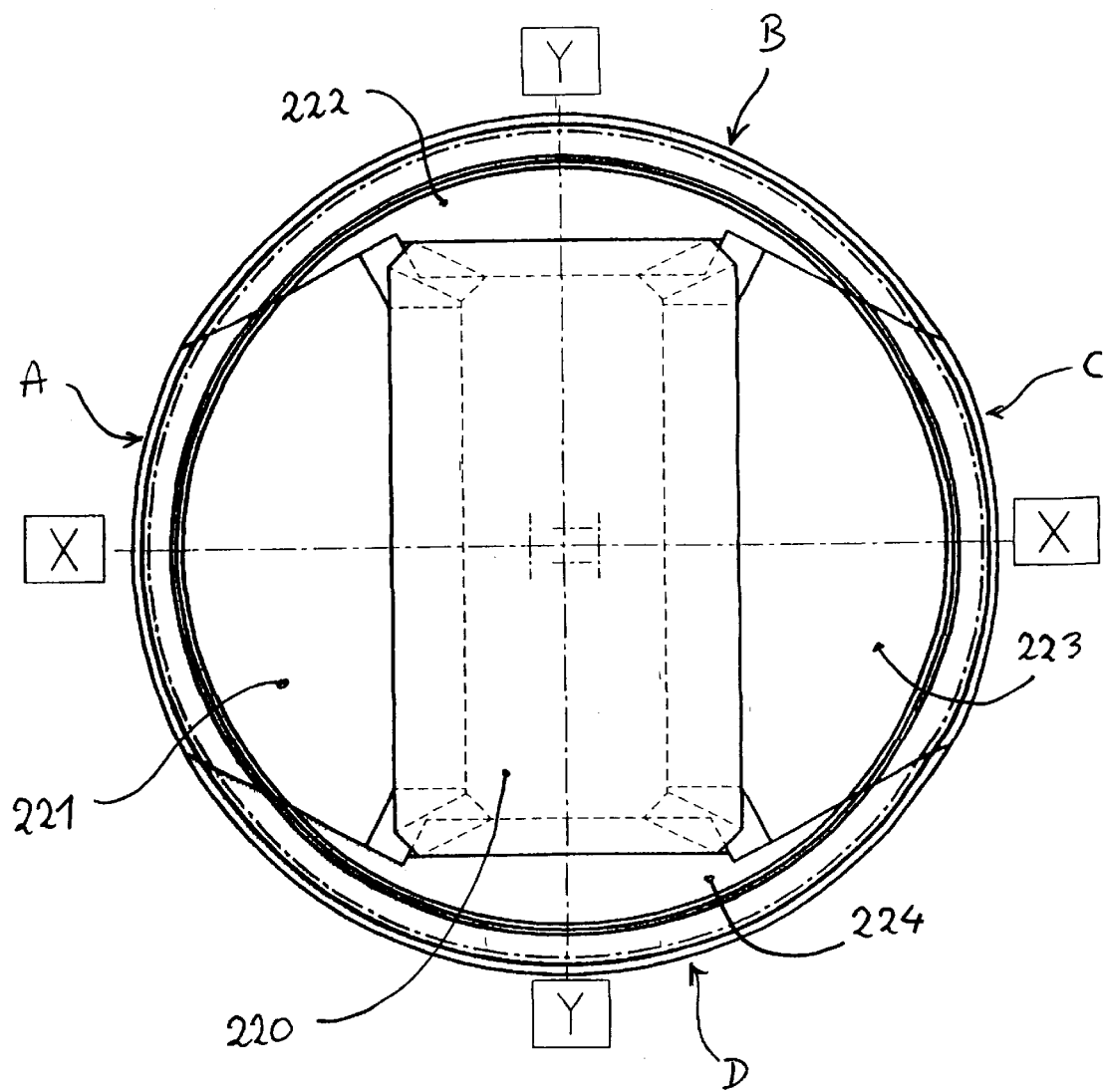

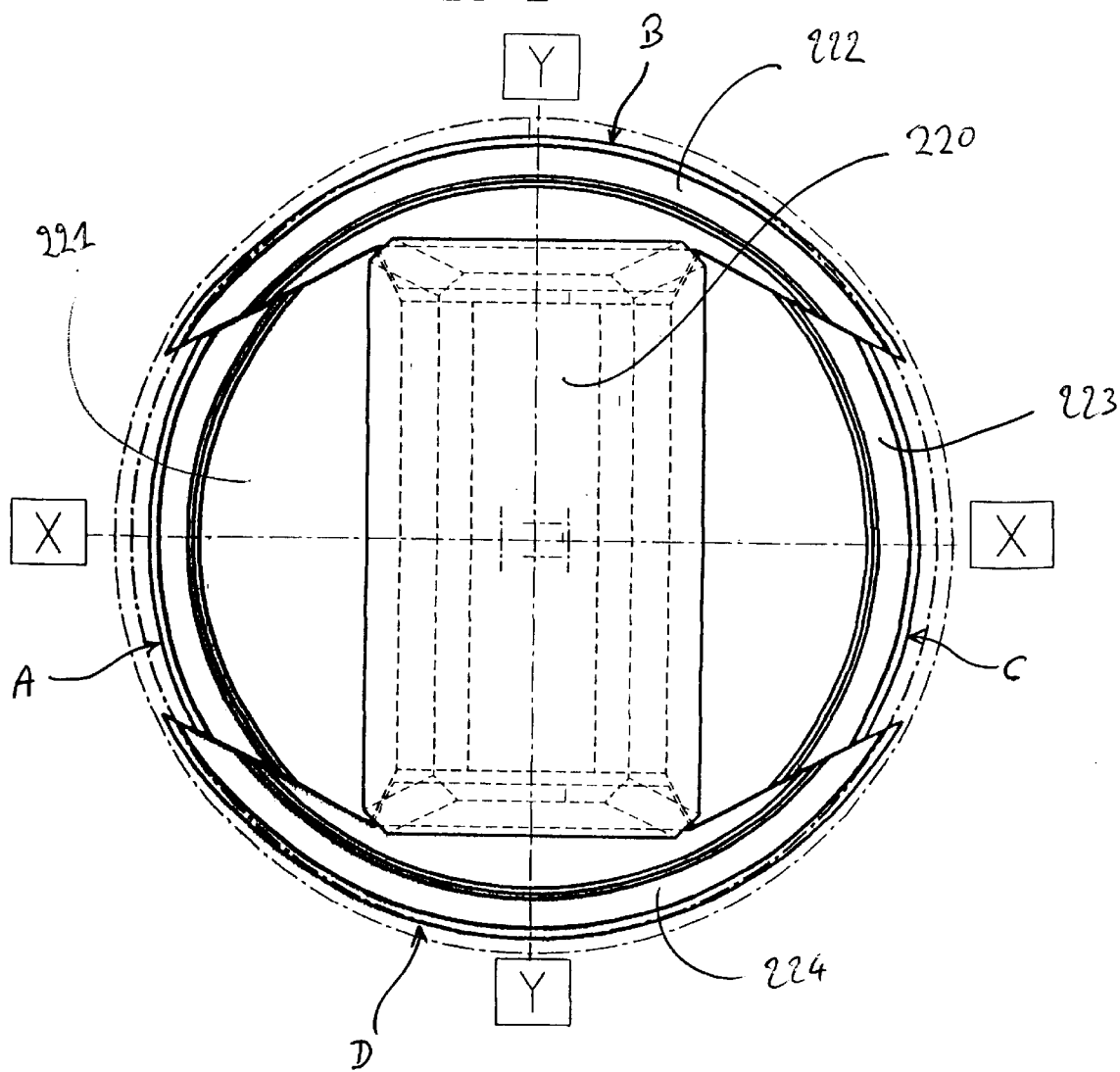

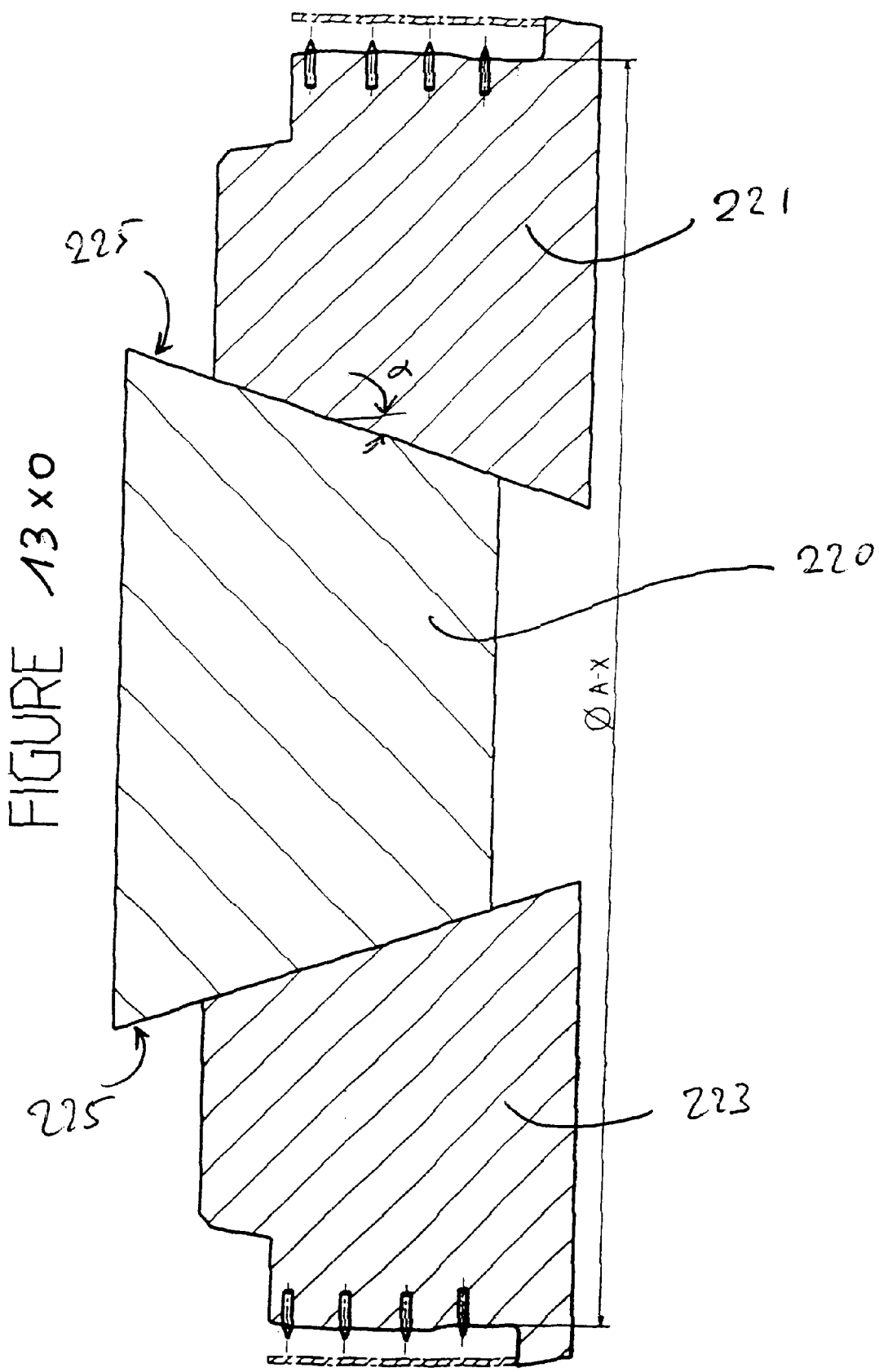

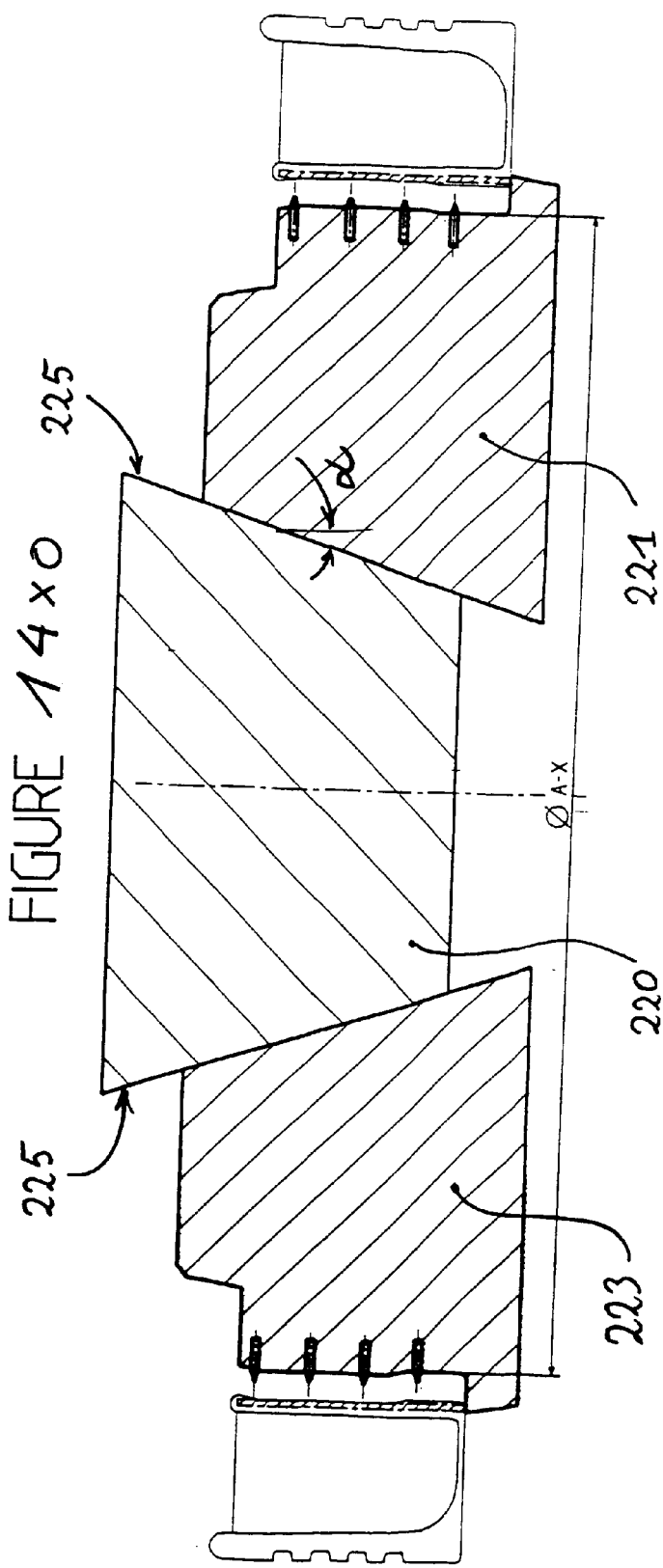

MANUFACTURE OF A SUPPORT

This application is entitled to the benefit of provisional application Ser. No. 60/113,174, filed Dec. 21, 1998.

BACKGROUND OF THE INVENTION

The present invention concerns the manufacture of elastic casings as supports used inside tires to bear the weight in case of a flat. More specifically, it concerns the manufacture of supports which have a generally inextensible belt at their base, made by means of reinforcing wires of the type that usually reinforces tires.

Patent Application EP 0,796,747 describes a particular example of such a support. In FIG. 1 of Patent Application EP 0,796,747, it can be seen that the base 10 of the support is reinforced by wires 11 arranged substantially at zero degree relative to a plane perpendicular to the axis of rotation of the support.

In the present invention, "wire" is understood to mean monofilaments as well as multifilaments, or assemblages like cords, plies or even any type of equivalent assemblage, whatever the material and treatment of those wires, such as surface treatment or coating or presizing in order to favor adhesion to the rubber. "Zero degree" is understood to mean an angle measured relative to the circumferential direction, that is, relative to a plane perpendicular to the axis of rotation of the support, thus following the usual conventions for tires. The angle is said to be "substantially" zero degree, because the reinforcement making it possible to oppose centrifugation of the support is created by winding of a wire or strip of parallel wires, with a certain pitch, the result being that the angle will not be zero degree in the strict sense, but, in practice, at least locally, slightly greater than zero degree, in order to be able to sweep the entire width desired.

A suitable material for creating such a support is rubber.

Different methods of manufacture of a molded object are known: compression molding, transfer molding and injection molding. Compression molding implies the introduction of the necessary volume of rubber inside the mold before closing it, while transfer molding and injection molding both imply closing of the mold before introduction of the necessary volume of rubber inside. The choice depends, notably, on the quantities planned, injection molding, while more expensive in initial investment, having a lower marginal cost, making possible a more uniform pressure and temperature during the vulcanization reaction and enabling a greater geometric quality to be attained.

But injection and transfer molding lend themselves poorly to producing nonhomogeneous products which are reinforced by flexible reinforcements. In particular, said processes, involving the introduction of material in a closed mold, are ill-suited for use when the reinforcement is a ply of wires, for the wires do not stay in place in the mold, or they stay in place very poorly. The rubber fed into the mold tends to displace the wires when it fills the mold. It therefore poses a major problem to ensure precise positioning of the wires in the vulcanized support. This is why the force feeding of rubber into a closed mold has not been adopted for wire-reinforced rubber parts. It is, for example, well known that tires are not injection molded; first of all, a rough blank is made very close to the final shape of manufacture of the tire, the blank containing the reinforcing wires inserted in the proper places between the different layers of rubber, and the molding is carried out by enclosing the necessary molding elements around the blank.

SUMMARY OF THE INVENTION

The object of the invention is to manufacture a support, such as described in patent application EP 0,796,747, by force feeding material into a previously closed mold, while making sure that the position of the reinforcing wires desired by the designer of the support is fully respected.

The invention proposes a method of manufacture of a support intended to be mounted on a vehicle rim, said support having an axis of rotation, a base defined by a substantially cylindrical radially inner face designed to be mounted around said rim, a crown designed to support the weight and a body between said base and said crown, said base having a substantially inextensible circumferential reinforcement, the radially outer face of said crown having a shape departing from the cylindrical shape, the body containing a plurality of axial recesses emerging from said support on at least one side, said method of manufacture using a mold having an axis corresponding to said axis of rotation, said mold comprising:

an inner core for molding the radially inner face, a crown molding ring, said ring comprising at least two parts radially separable from each other, said separable parts making it possible to mold said radially outer face of said crown, at least one shell containing a plurality of axial fingers for laterally molding said body and said recesses, said core, said ring and said shell cooperating to define, at least partially, a closed cavity for molding said support, said core comprising at least two components and being capable of assuming a molding configuration in which its components form a circumferentially continuous molding surface for molding said radially inner face, the molding surface being defined by a reference diameter $\Phi$ corresponding generally to the inner diameter of said support, said core also being capable of assuming a mold stripping configuration different from the molding configuration, defined by an overall length E around said molding surface less than the product of $\pi$ and reference diameter $\Phi$, said method of manufacture comprising the following steps:

prefabricating a ring having said circumferential reinforcement;

establishing the mold stripping configuration of said core;

installing said ring on said core;

establishing the molding configuration of said core;

closing the mold and then force feeding into the mold an injectable material which is elastic in final state;

axially separating said shell containing axial fingers, at least partially, in relation to at least one of the components that are the molding ring and the core;

then establishing the mold stripping configuration of said core and radially separating said parts from the crown molding ring;

discharging said support.

In the context of the present invention, a nonpneumatic casing designed to be used alone in normal service will be considered equivalent to a support, an accessory intended to be mounted inside a tire in order to provide it with a means of temporary operation at zero pressure, adjustments of choice of materials and/or of design of the product itself not being the subject of the present patent invention. In other words, this invention is not limited to a specific application of the product. Its use is advantageous whenever molding or mold stripping becomes rather difficult, for example, because the object manufactured is reinforced, notably, by wires. It is not limited to a particular material, provided that the material meets the needs of the support in terms of characteristics in final state and, for the manufacturing phase, provided that the material can be force fed into a closed mold through mold filling ducts.

The invention proposes using pressurized feeding into a closed molding cavity, in combination with an inner core in several parts, whereas single-part cores are generally used when injection or transfer molding is employed because closing of the mold poses no problem, since that occurs prior to filling, and mold stripping of the product generally adapts quite well to stresses on the latter, since it is in a reticulated or vulcanized state, therefore possessing good mechanical properties. Thus, the invention uses, for example, a core in several parts for molding a support whose radially inner face can be directly or easily stripped from the mold, even outside a single-part core, said radially inner face forming a surface presenting, in relation to a strippable surface parallel to the axis of rotation, deviations not exceeding a few millimeters. In general, said core presents a molding configuration and a mold stripping configuration, different in shape from the preceding one, facilitating not only mold stripping, but also facilitating the installation of a ring in the form of an inextensible belt on the core, at the beginning of manufacture of a support.

The invention also extends to a mold adapted for use of the invention by means, for example, of a standard rubber injection machine of the type marketed under the "REP" name.

According to the invention, the mold presents an axis corresponding to the axis of rotation of the support to be molded, for molding of a support intended to be mounted on a vehicle rim, said support having an axis of rotation, a base having a generally cylindrical radially inner face intended to be mounted on said rim, a crown intended to bear the weight and a body between said base and said crown, said base comprising a substantially inextensible circumferential reinforcement, said mold having an axis corresponding to said axis of rotation, said mold containing an inner core for molding said radially inner face, said mold containing other parts creating a closed cavity with said core for molding said support, said core consisting of at least two separable molding parts, one of the parts including a molding sector extending circumferentially from a first edge to a second edge and partially defining the molding surface of said radially inner face, said molding sector being extended, directly or indirectly, by an interface extending from said first edge to said second edge and passing the inside of the core, said interface forming one or more bearings generated by a straight line translated parallel to itself and inclined at a first angle relative to the axis of the mold, said molding parts being capable of taking a molding configuration in which said parts form a circumferentially continuous molding surface, defined by a reference diameter $\Phi$ generally corresponding to the inner diameter of said support, and a mold stripping configuration through sliding of one part over another part along said interface, said mold stripping configuration having an overall length E less than the product of $\pi$ and the reference diameter $\Phi$.

The bearing or all the bearings at the interface or interfaces between rigid parts is or are preferably flat in order to facilitate their machining. Although a core with only two parts, the interface of which is an inclined plane relative to the axis, can be restricted by relative axial sliding, keeping said parts in contact with each other in order to produce a mold stripping configuration which makes it possible to install on top an inextensible ring, it is preferable to use a core containing at least three rigidly separable parts. The core also preferably has a plane of symmetry containing said axis of the mold.

DESCRIPTION OF THE DRAWINGS

The following can be seen in the different figures:

In FIG. 2, the core used in the first embodiment of the invention, in closed configuration;

In FIG. 3xc, the core in a subsequent configuration, seen in the same section as that of FIG. 1, "c" indicating that the core is closed;

In FIG. 4xo, the same elements as those of FIG. 3xo, in mold stripping phase;

In FIG. 4y, the same element as shown in FIG. 3y, in the same mold stripping phase as that of FIG. 4xo;

In FIG. 9xo, the core of the second embodiment, in an initial configuration, "x" indicating that this is a section along XX in FIG. 8, "o" indicating that the core is open, as in FIG. 8;

In FIG. 9xc, the core in a subsequent configuration, "c" indicating that the core is closed, as in FIG. 7;

In FIG. 9yo, the core seen in section YY in FIG. 8;

In FIG. 9yc, the core seen in section YY in FIG. 7;

In FIG. 10xo, the same elements as those of FIG. 9xo, in mold stripping phase;

In FIG. 10yo, the same element as that of FIG. 9yo, in the same mold stripping phase as that of FIG. 10xo;

In FIG. 11, the core used in a third embodiment of the invention, in closed configuration;

In FIG. 12, the core of FIG. 11, in open configuration;

In FIG. 13xc, the core in a subsequent configuration, "c" indicating that the core is closed, as in FIG. 11;

In FIG. 13yc, the core seen in section YY in FIG. 11;

In FIG. 14xo, the same elements as those of FIG. 13xo, in mold stripping phase;

In FIG. 14yo, the same element as that of FIG. 13yo, in the same mold stripping phase as that of FIG. 14xo;

DESCRIPTION OF PREFERRED EMBODIMENTS

Figure 1:
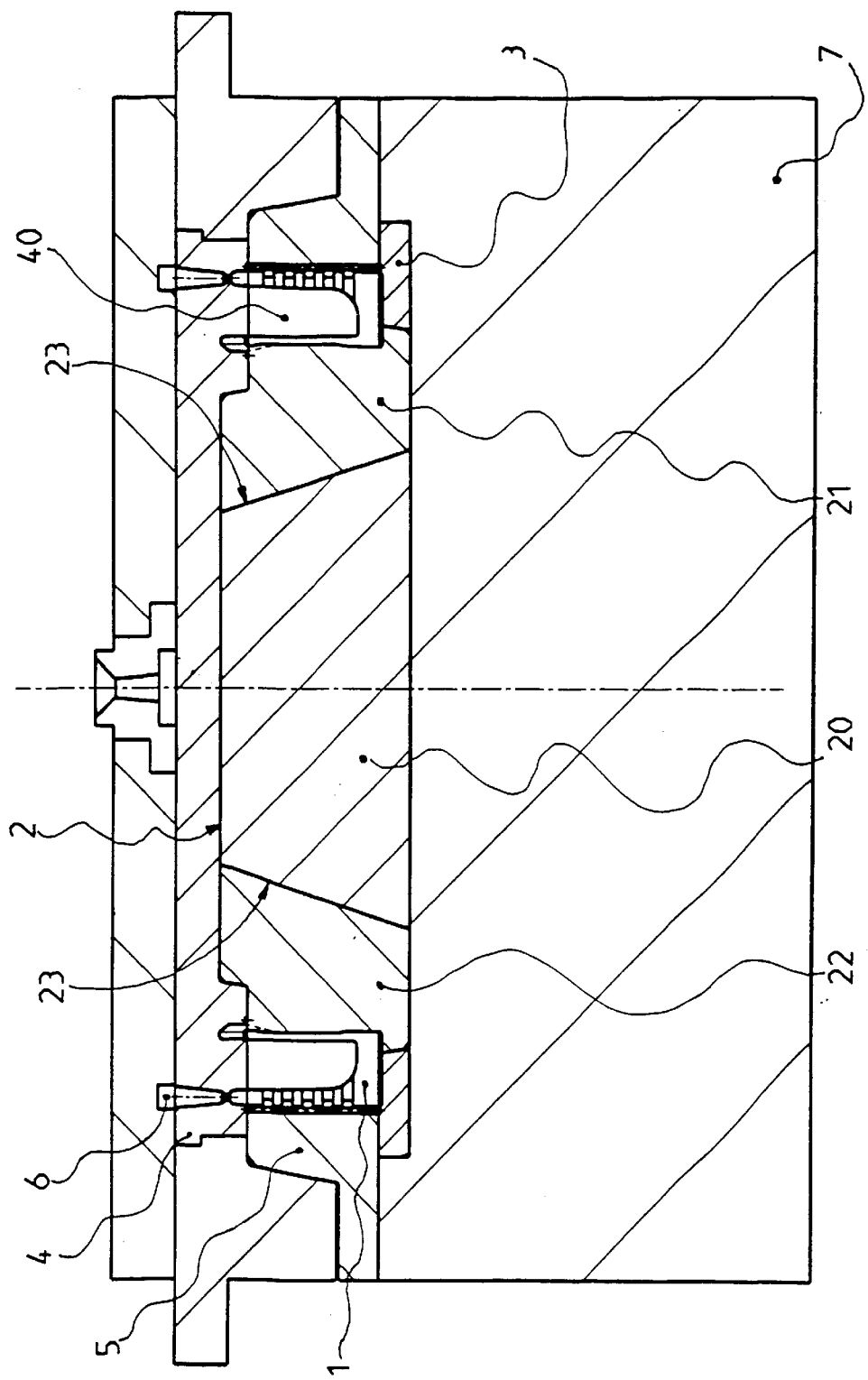
In FIG. 1, a mold according to a first embodiment of the invention, installed in an injection press, in closed configuration.

FIG. 1 shows the molding cavity 1 with the shape for manufacture of the support. Said cavity 1 is defined by an inner core 2 and other parts, which include a lower platen 3 (mounted on a platen holder 7), an upper platen 4 and segments 5 for molding the bearing surface proper, radially situated outside the support. Since in this particular example it is desired to mold grooves and bosses on the bearing surface (radially outer surface), the outer support surface is molded by a plurality of segments 5 which are capable of a radial motion. Two of the injection ducts 6 can be seen, others being distributed around the circumference of the support.

The press contains means (not shown) for controlling the movement of the segments 5 and is equipped with a mechanism capable of imparting a relative back-and-forth motion to the platen holder 7 and upper platen 4. This relative back-and-forth motion makes possible not only the opening of the mold in order to remove the support after vulcanization, but also ensures the specific movements of the core 2, as will be clearly described below.

The core 2 consists of three separable rigid parts: a central part 20 and two complementary parts 21, 22. The three rigid parts contain surfaces for molding the radially inner face of the support. Each of the complementary parts 21, 22 contains at its base a flange 210, 220 forming a radial projection, the role of which will be apparent below. The center part 20 also contains a flange 200. Those molding surfaces are defined by four adjacent molding sectors A, B, C, D. The center part 20 contains two non-adjacent molding sectors A and C which are diametrically opposite. Each of the complementary parts 21, 22, has respectively, sector D or B of the other two molding sectors. The center part also has two flat bearing surfaces 23, inclined at the same angle relative to the axis of the mold (see FIG. 3$xo$). Said flat bearings surfaces 23 are adjacent molding sectors A and C. These flat bearing surfaces 23 are designed to cooperate with corresponding bearing surfaces 24 arranged on the back of each of complementary parts 21 and 22. Hence, an axial movement of said center part can control a radial movement of the complementary parts 21 and 22.

Let us remember that the support includes, as described in patent application EP 0,796,747, a circumferential reinforcement consisting essentially of circumferentially oriented reinforcing wires embedded in an elastomeric matrix. Furthermore, the support includes a body provided with a crown that has a radially outward bearing surface, said crown being connected to said base and said body and having a plurality of generally axial recesses. In order to mold these recesses, the mold contains fingers 40 projecting from the upper platen 4. Consequently, the base of the support has a rather small radial thickness, measured between said radially inner face and any of the recesses (typically less than 15 mm). On injection, the flow of rubber is confined between the fingers 40 and the reinforcing wires arranged on the radially lower base of the molding cavity.

The wires themselves must be installed in the mold at the beginning of each production run. It is therefore advisable that the required handling be simple in order to guarantee good positioning and to be rapid in order to guarantee high productivity. A convenient method consists of prefabricating a ring 90 forming a sort of belt containing the circumferential wires that it is necessary to incorporate in the base of the support.

To manufacture such a ring 90, the circumferential reinforcing wires coated in an elastomeric matrix can, for example, be deposited on a chuck comparable to a drum for the first stage of manufacture of a tire. For this purpose, a single rubber-coated wire, a strip of rubber-coated wires or a ply of rubber-coated wires is used, as is well known for the manufacture of the zero-degree reinforcements commonly found in the crown of tires for passenger vehicles. Said ring 90, being almost inextensible circumferentially, will in fact constitute the inner skin of the support and must therefore be installed directly against the molding wall of the radially inner face of the support. Now, this ring is very flexible, which makes its correct installation in the mold difficult.

It is therefore advisable to lock the reinforcing wires firmly in the mold, so that, on injection of the rubber, said wires will stay put in the place imposed on them by the architecture of the support. Thus, on establishment of the molding configuration, the ring consisting here of circumferentially oriented wires is preferably stressed in tension.

The invention makes it possible to resolve the dilemma of having the rings set formerly in place in the mold during injection or any form of pressurized feeding of the material into the closed mold, without compromising either easy installation of said reinforcing wires in the mold or easy mold stripping of the manufactured support.

Figure 3X:
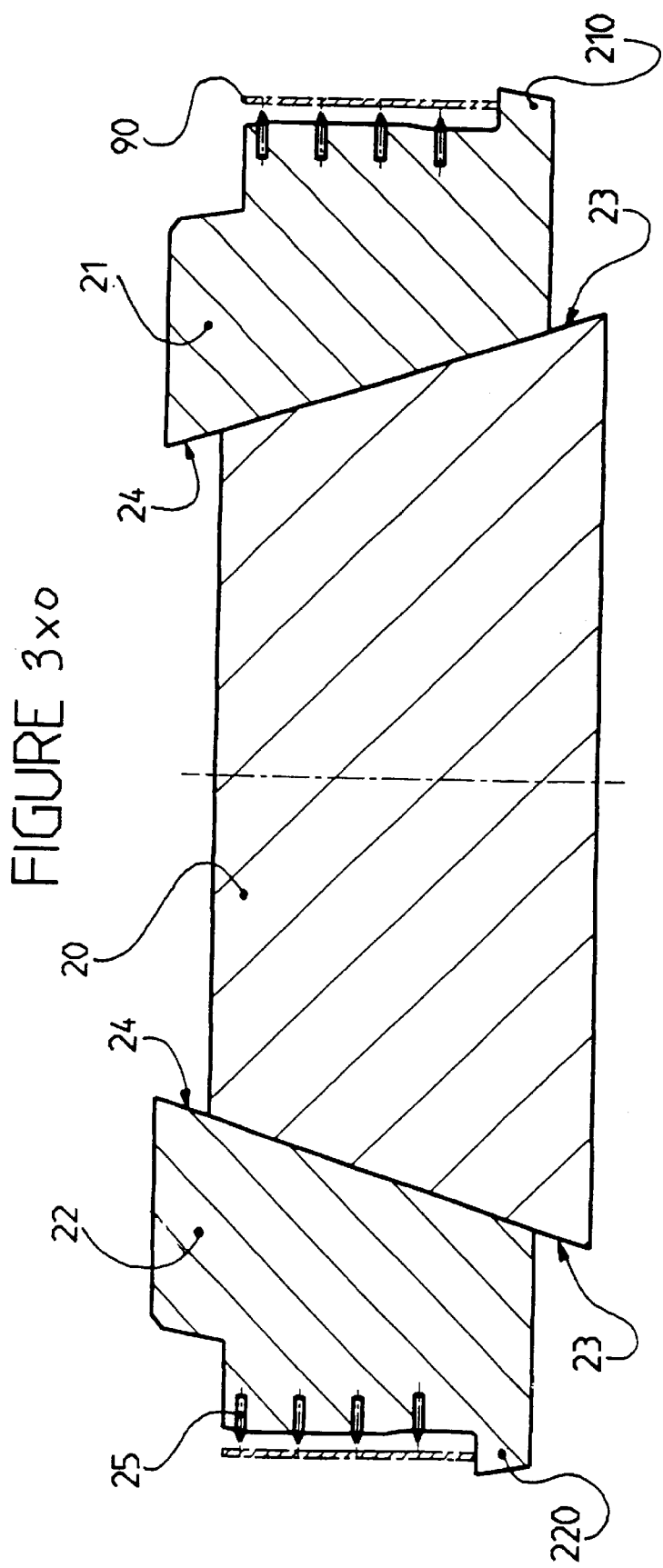
In FIG. 3xo, the core of the first embodiment, in an initial configuration, seen in the same section as that of FIG. 1, "x" indicating that this is a section along XX in FIG. 1, "o" indicating that the core is open.
Figure 3X:
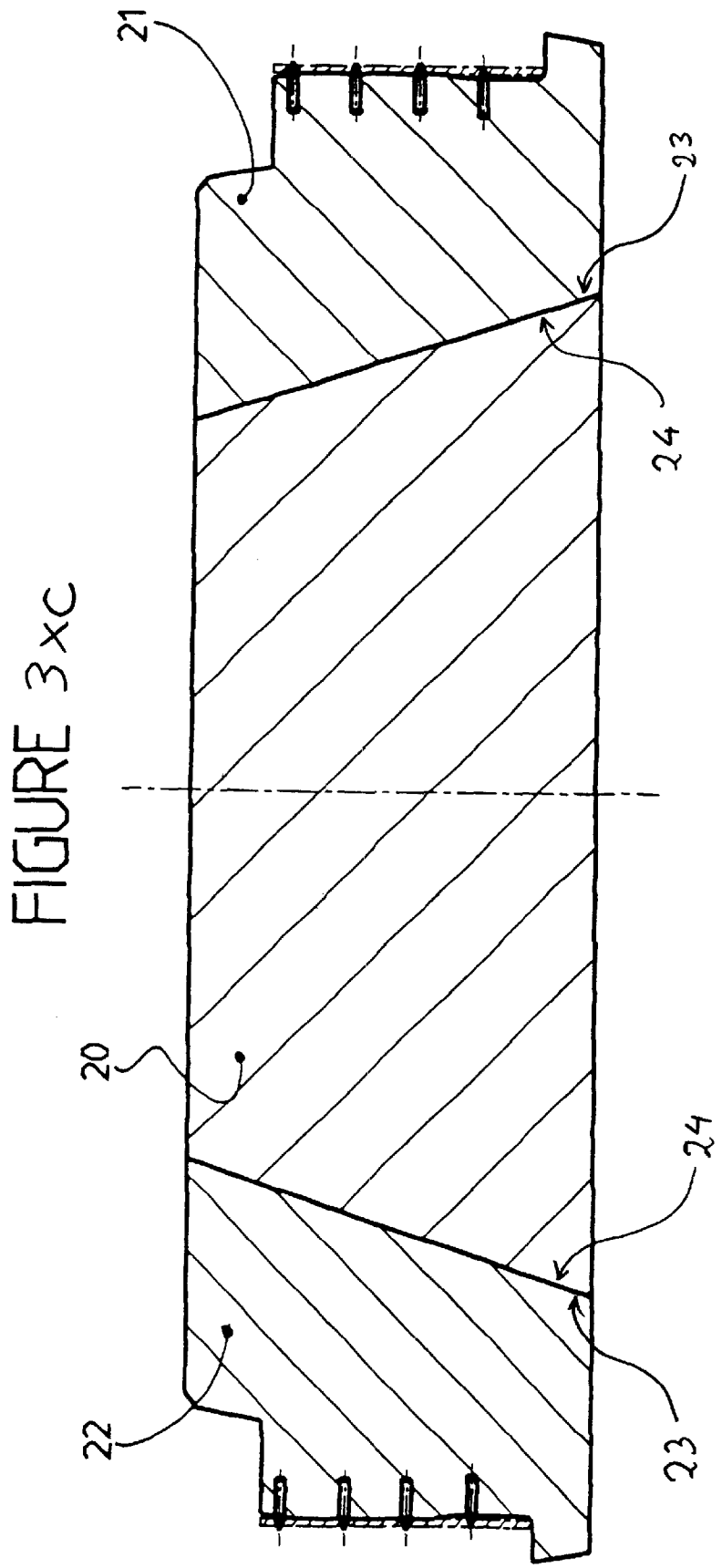
Figure 3Y:
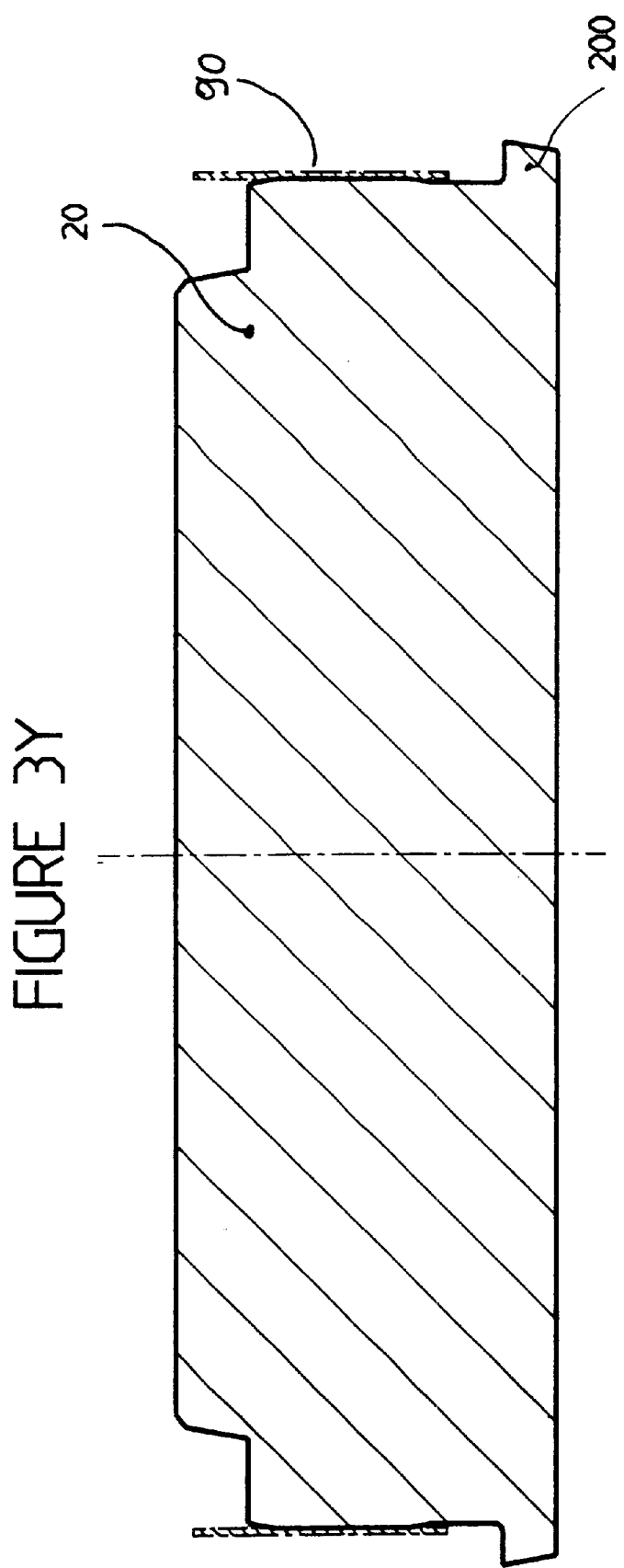
In FIG. 3y, the core seen in section YY of FIG. 2.
Figure 5:
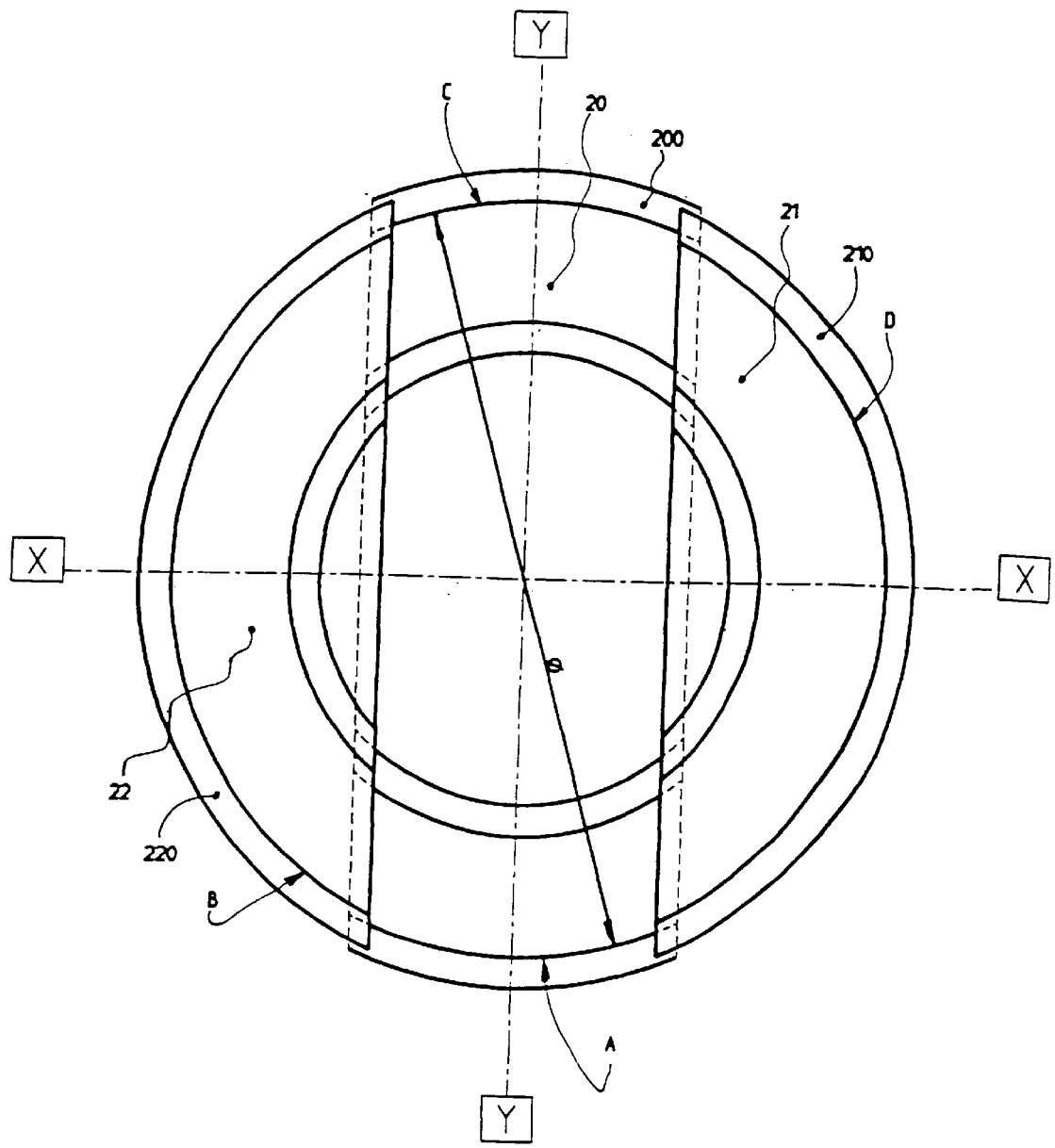
In FIG. 5, the core seen in the same plane as that of FIG. 2, in the same initial configuration as that of FIG. 3xo.

According to the invention, the parts of the core 2 are capable of assuming a molding configuration in which said rigid parts form a circumferentially continuous molding surface, an exact image of the final production shape of the radially inner surface of the base of the support. Said molding configuration is characterized by an overall reference diameter corresponding to the inner diameter of said support. FIGS. 1, 2 and 3$xc$ are characteristic of the molding configuration. The parts of the core 2 are also capable of taking a mold stripping configuration, characterized by an overall length E of the molding parts less than the reference diameter. This means that, considering $\Phi$ the diameter of the molding surface defined by the said four adjacent molding sectors A, B, C, D (see FIG. 5), the length of a taut cord on said molding surface in the mold stripping configuration, equal to E, is strictly less than $\pi\Phi$. FIGS. 3$xo$, 4$xo$, which correspond to FIG. 5, are typical of the mold stripping configuration.

The principal stages of manufacture are as follows. A ring 90 containing the reinforcing wires is prefabricated in any appropriate manner. Then, the mold stripping configuration of the core 2 being established (see FIG. 5, as well as FIG. 3$xo$ for the section along plane XX of FIG. 5, and FIG. 3$y$ for the view along plane YY of FIG. 5), said ring 90 is installed on said core 2. The ring 90 is placed against the flanges 210 and 220, which insures its precise axial positioning. Then the molding configuration of the core (see FIG. 2, as well as FIG. 3$xc$ for the section along plane XX of FIG. 2, and FIG. 3$y$ for the view along plane YY of FIG. 2) is established by radial deployment of the complementary parts 21 and 22. Next, closing of the mold can be completed and the material constituting the body of the support can be force fed, for example, by injection, and then, of course, mold stripping can take place.

In order to further improve the stability of the ring 90, each molding sector of said complementary parts 21 and 22 contains a plurality of radially projecting spikes 25. On establishment of the molding configuration, these spikes 25 penetrate the ring 90 in order to hold the wires in place. After mold stripping, these spikes 25 leave small hollows on the inner surface of the support, which is no problem in the use of the support.

Mold stripping, of course, entails complete opening of the mold. The mold stripping configuration is preferably restored (see FIGS. 4$xo$ and 4$y$) in order to facilitate removal of the support. It can also be noted that the presence of spikes engaged in the vulcanized rubber facilitates extraction of the fingers 40 at the very beginning of mold stripping.

It can be seen, notably for the simplest support shapes and in case there are no spikes, that the course of the radially inner face forms a strippable surface parallel to said axis of rotation. It will therefore be understood that the design of the core, at the base, is not dictated by molding considerations, but mainly by the intention to render molding by injection possible on a wire-base reinforcement, having little capability for supporting itself during an injection stage. More generally, the invention proposes the use of force feeding into a closed molding cavity, in combination with a core in several parts, in order to mold a support whose radially inner face forms a surface that presents deviations in radial height of less than 5 mm with respect to a strippable surface parallel to the axis of rotation.

As for the crown of the support whereby the load is transmitted to the base, it can be seen that it contains grooves molded by corresponding ribs 50 provided on the segments 5 of the mold. The mold also contains a plurality of axial fingers 40 arranged at least on the upper platen 4. In order to facilitate extraction of these fingers during mold stripping, each of the said platens or shells containing the axial fingers can be axially separated, at least partially and in relation to the core, before establishing the mold stripping configuration of said core. Likewise, to facilitate the extraction of those fingers on mold stripping and, in particular, in case the shape of the radially outer face of the crown departs from a cylindrical shape, each of said platens or shells containing the axial fingers can also be axially separated, at least partially and in relation to the crown molding rings, before radially separating said parts from the ring.

Figure 6:
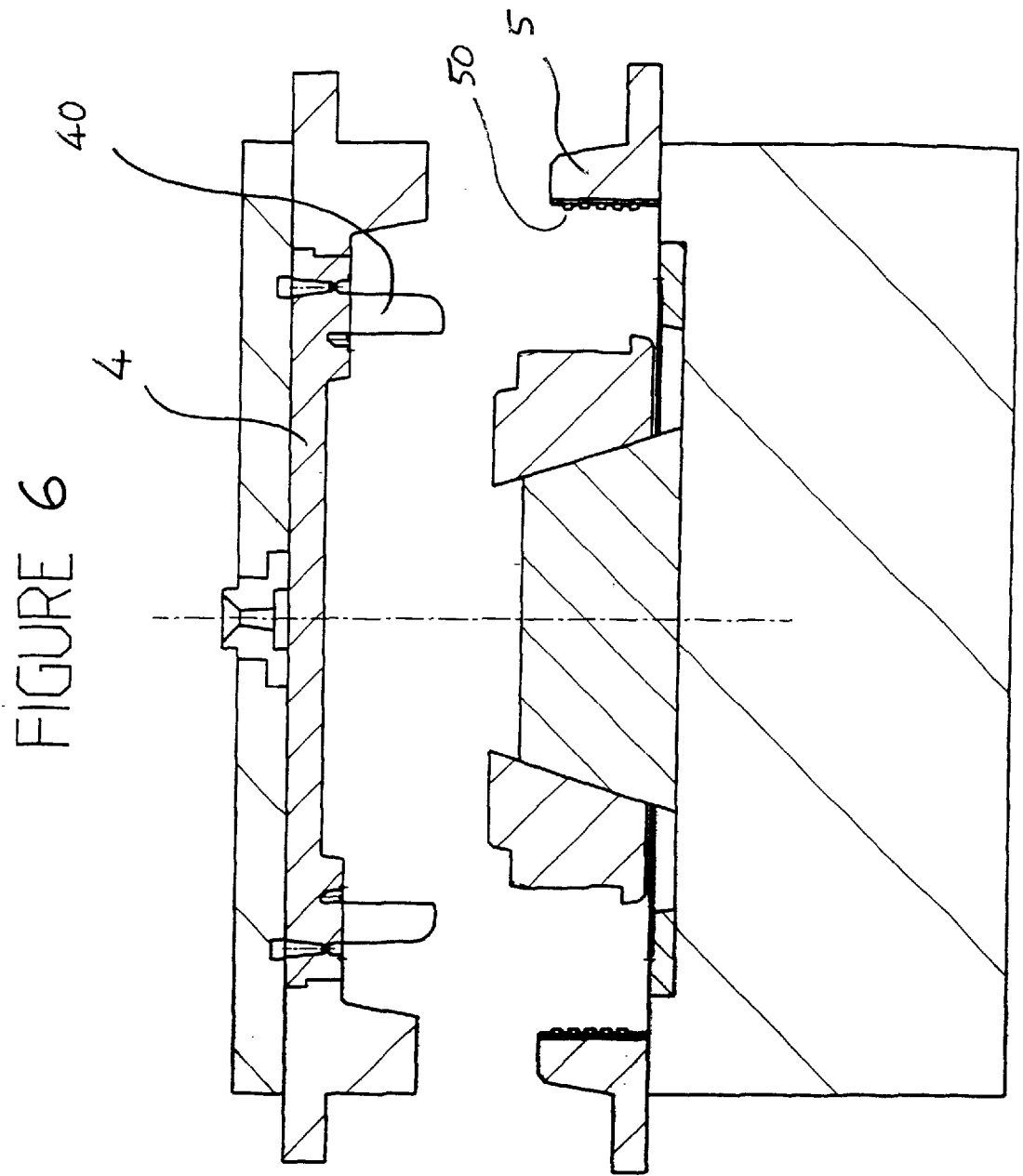
In FIG. 6, the mold according to the first embodiment of the invention, installed in an injection press, showing, notably, a core along a section XX in FIG. 2, in open position.
Figure 7:
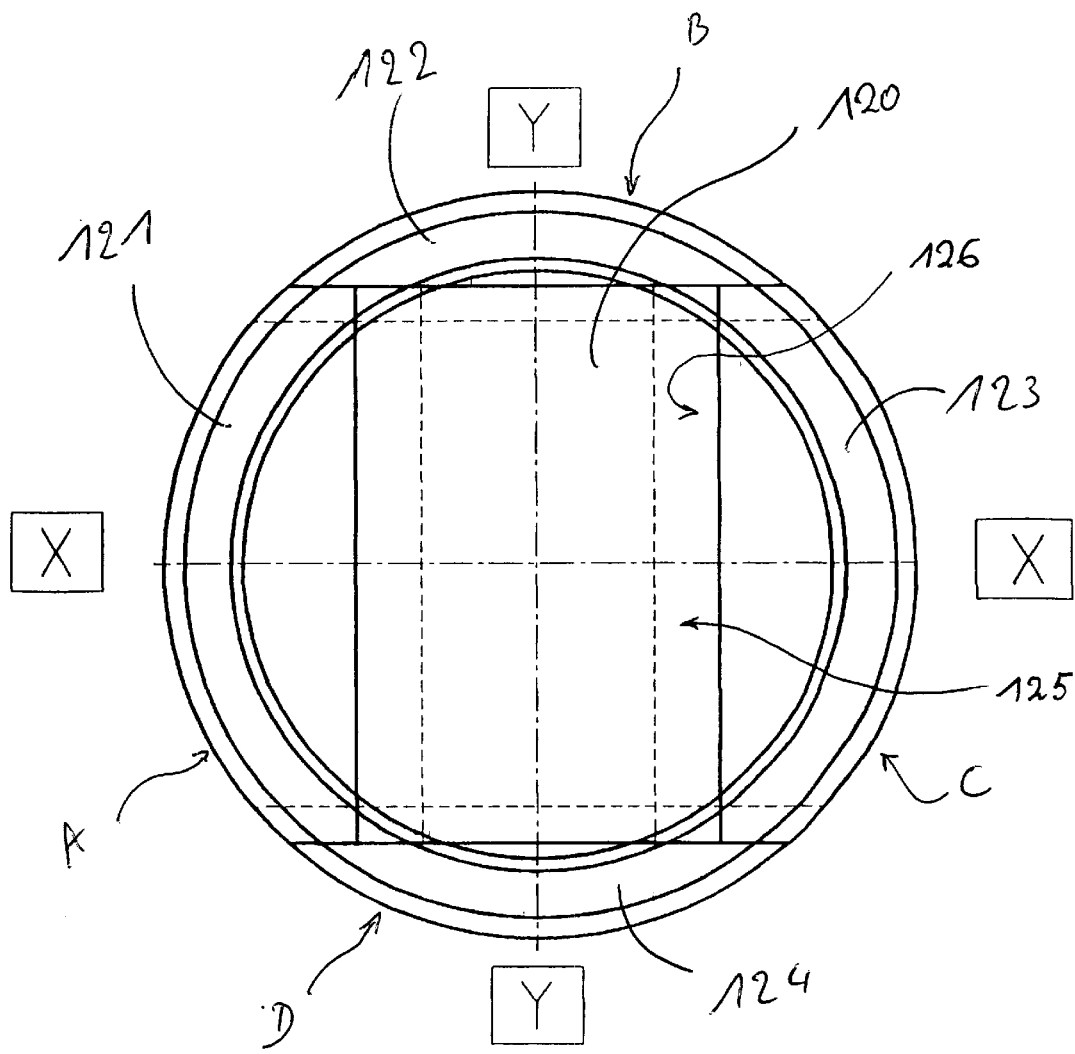
In FIG. 7, the core used in a second embodiment of the invention, in closed configuration.
Figure 8:
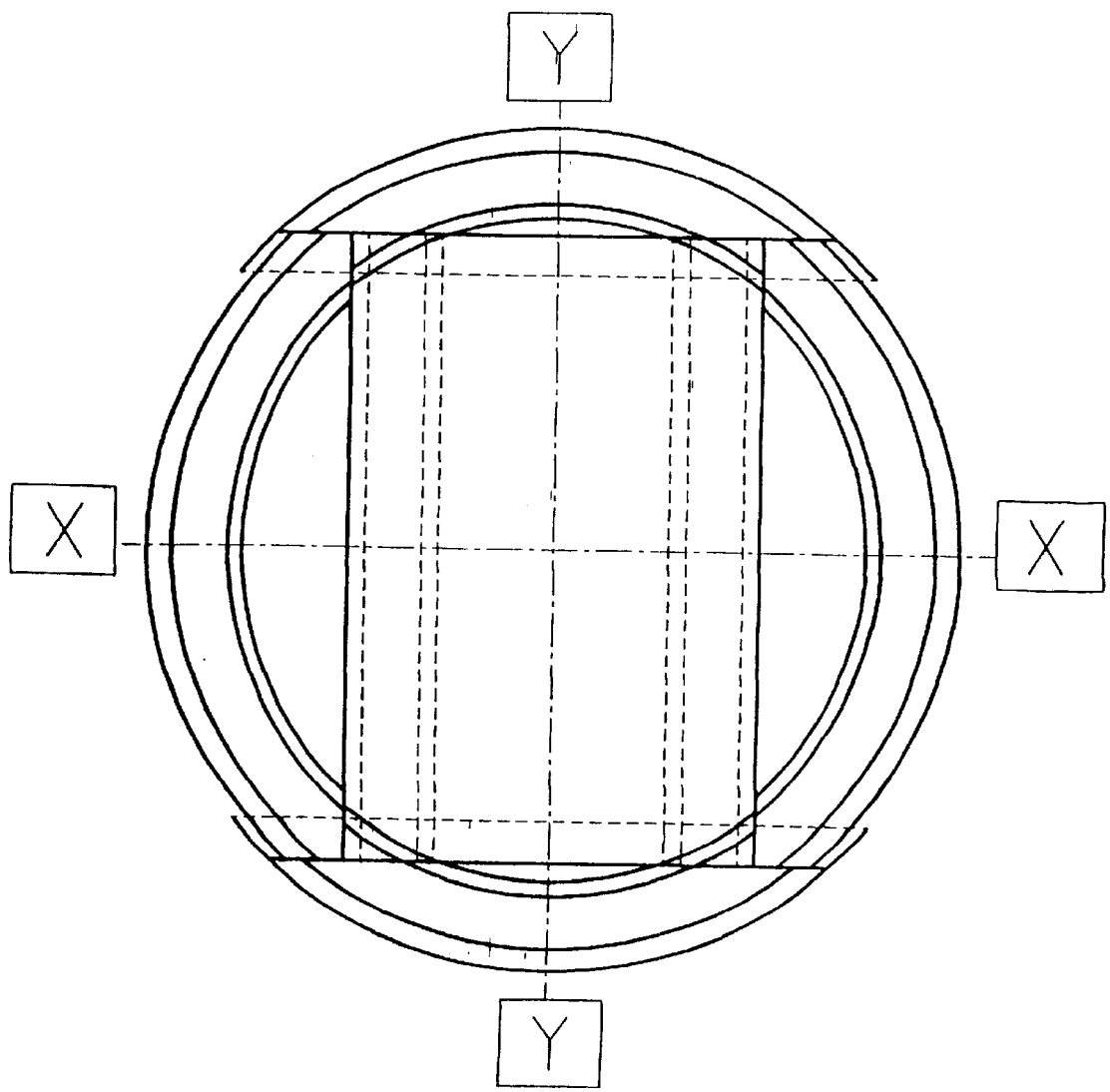
In FIG. 8, the core of FIG. 7, in open configuration.

Considering FIGS. 1 and 6 together, it is easy to understand that if the segments 5 are still in their molding position (that of FIG. 1), while the upper platen 4 is axially shifted toward the position it occupies in FIG. 6, carrying with it the fingers 40, engagement of the ribs 50 in the support greatly helps to keep the support on the core. Opening of the segments 5 (as well as of the core) then poses no mold stripping problem.

After having described in detail a first embodiment of the invention, different more elaborate variants are presented, focusing on the improvements they introduce.

FIGS. 7 to 10 illustrate a second embodiment of the invention, in which said core includes five rigidly separable molding parts, a center part 120 and four complementary parts 121, 122, 123, 124. The four complementary parts have four adjacent molding sectors A, B, C, D constituting molding surfaces of said radially inner face. The center part 120 contains two bearings 125, inclined by angles of the same value and of opposite signs relative to the axis of the mold. Said bearings 125 are intended to cooperate with corresponding bearings 126 arranged on the back of two of the complementary parts 121, 123. Said corresponding bearings 126 are adjacent said molding sectors, so that an axial movement of said center part controls a radial movement of said two complementary parts 121, 123.

There is then a radial backward movement of only two (A and C) of the four adjacent molding sectors, just as in the preceding embodiment. But, in contrast to said first embodiment, on mold stripping, there is no relative axial movement between the support and molding sectors A, B, C and D, as is clearly visible in FIGS. 10xo and 10yo. On consulting FIGS. 4xo and 4y, it can be understood that there is unavoidable relative axial movement between the support and the molding sectors. The same difference is encountered in the molding phase. Stressing of the ring 90 is unavoidably accompanied in the final phase by a slight relative axial movement, and therefore by friction, between the ring 90 and the center part 20 in FIG. 3y. On the other hand, there is no relative axial movement and therefore no parasite friction in the same phase with the second embodiment of the invention, which is immediately apparent on consulting all of FIGS. 9.

FIGS. 11 to 14 illustrate a third embodiment of the invention, in which the core contains five rigidly separable molding parts, a center part 220 and four complementary parts 221, 222, 223, 224, just as in the second embodiment of the invention. The four complementary parts likewise have four adjacent molding sectors (A, B, C, D) constituting molding surfaces of said radially inner face. Just as in the second embodiment of the invention, there is no relative axial movement, and therefore no parasite friction, either in the phase of installation of a ring 90 or in the phase of mold stripping of the support.

Figure 13X:
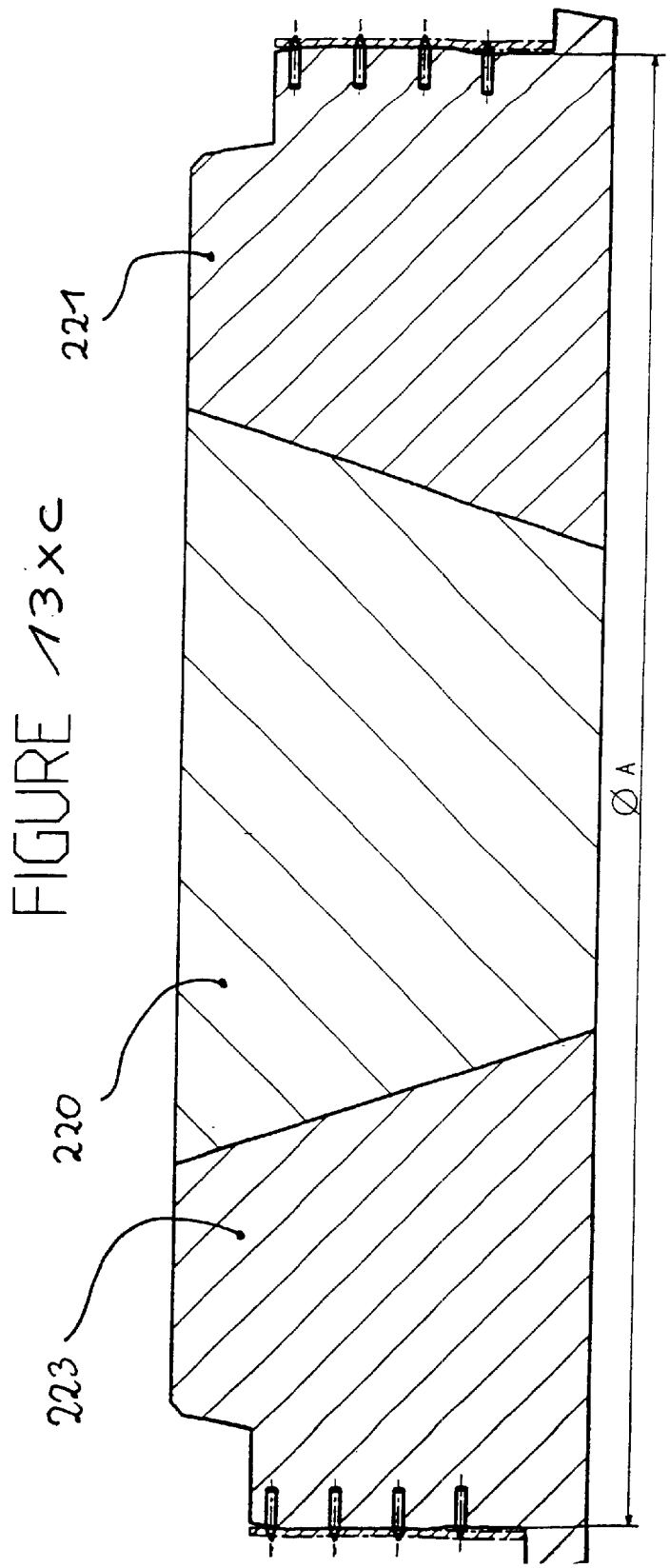
In FIG. 13xo, the core of the third embodiment, in an initial configuration, "x" indicating that this is a section along XX in FIG. 12, "o" indicating that the core is open, as in FIG. 12.
Figure 13:
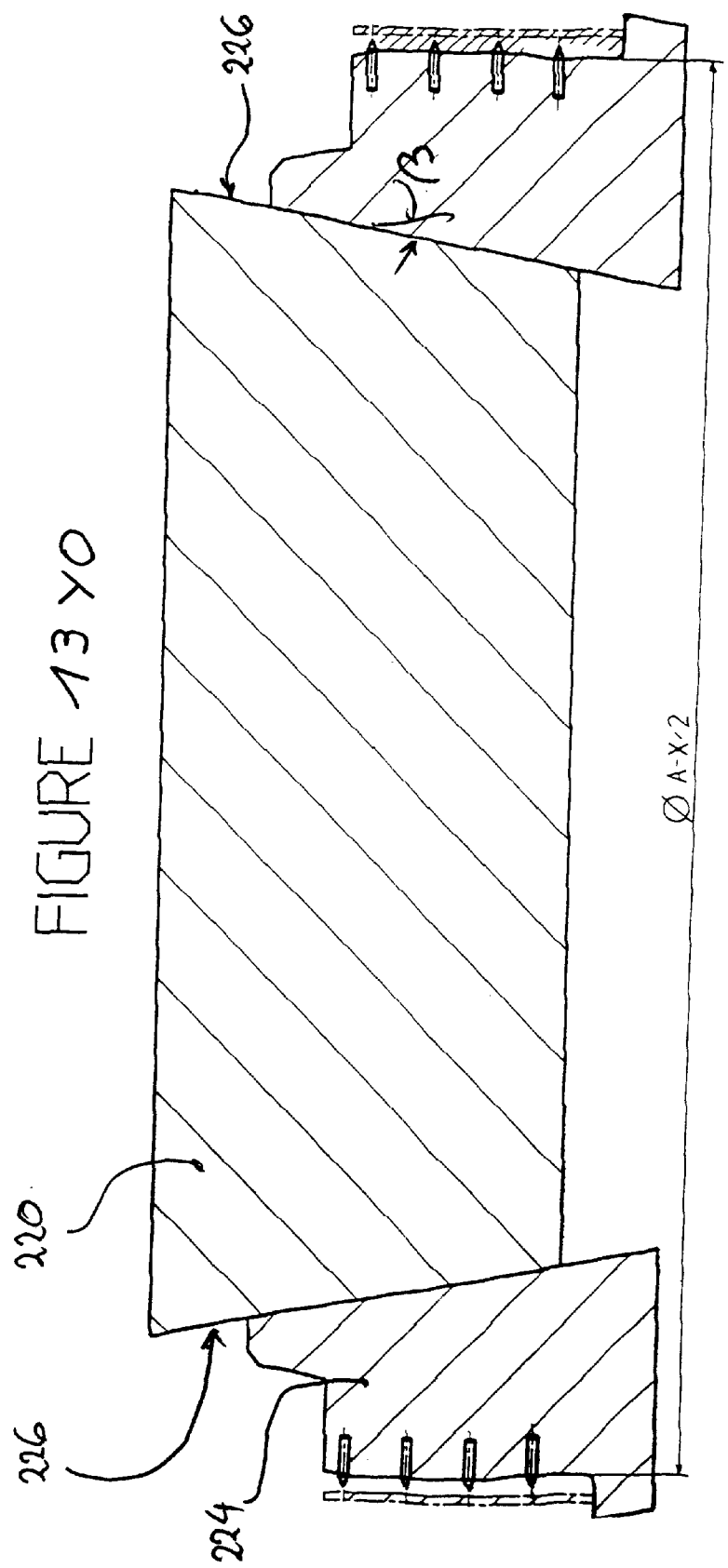
In FIG. 13yo, the core seen in section YY in FIG. 12.
Figure 13Y:
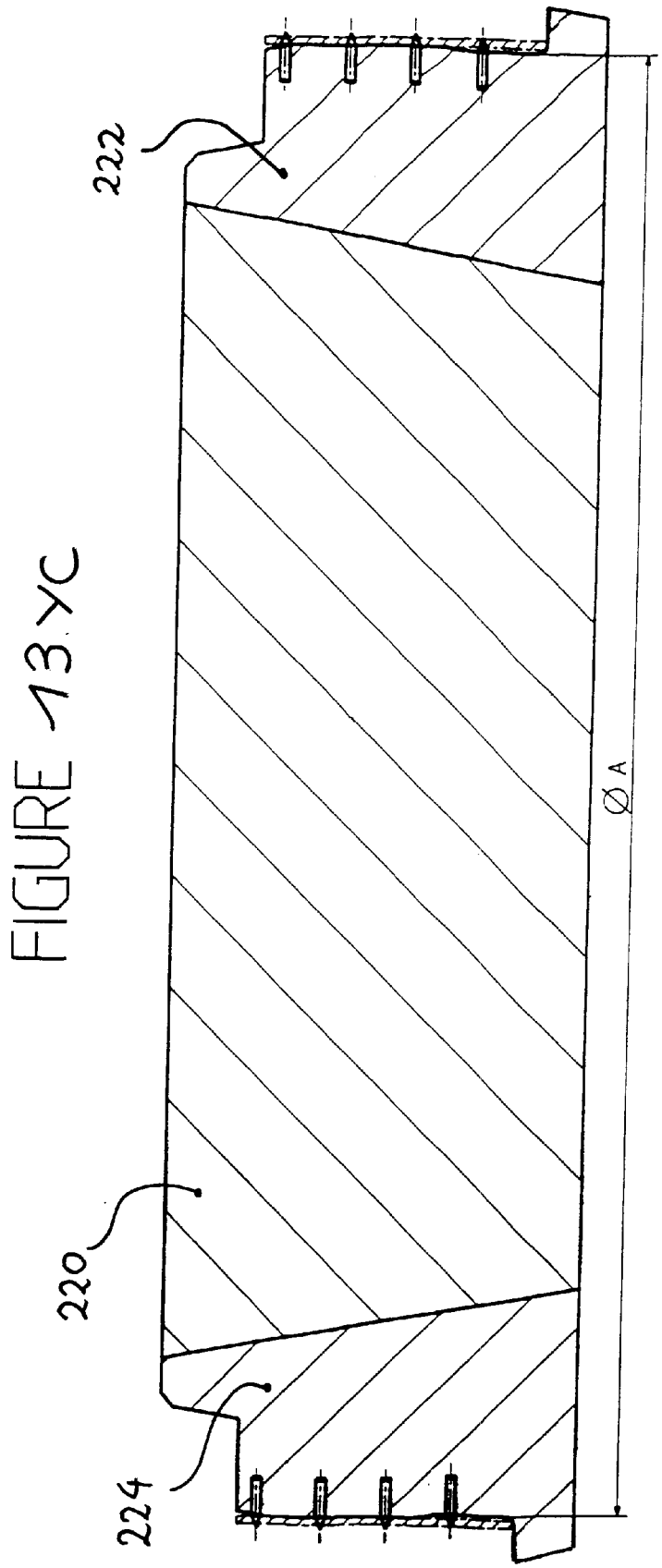

The difference is that, this time, all the complementary parts 221, 222, 223, 224 can be radially retracted. For this purpose, the center part 220 contains two pairs of bearings 225, 226 inclined for the first pair by angles $+\alpha$ and $-\alpha$ relative to the axis of the mold, and for the second pair by angles $+\beta$ and $-\beta$ relative to the axis of the mold, therefore also opposite and of different value $\beta$, preferably at least in the ratio of two to one with respect to value $\alpha$. These bearings all play a functional role in controlling the radial backward movement of molding sectors A, B, C and D. Said bearings are intended to cooperate with corresponding bearings 227, 228 arranged on the back of all the complementary parts 221, 222, 223, 224, said corresponding bearings 227, 228 being adjacent said molding sectors, so that an axial movement of said center part controls a radial movement of said complementary parts. The advantage is that all the complementary parts are retracted radially. This is what can be clearly seen in FIGS. 13xo and 13yo or 14xo and 14yo, the difference in configuration between FIGS. 9yo and 10yo for the second embodiment and FIGS. 13yo and 14yo for the third embodiment being clearly apparent.

It can be observed that, in the second embodiment, the center part 120 also contains two pairs of bearings inclined at angles having two different values. In that case, however, one of the angles plays no role in the kinematics. Avoiding bearings parallel to the axis of the mold is of interest in ensuring the cancellation of play on closing of the mold and, therefore, the similar behavior of the core in the second and third embodiments.

Figure 15:
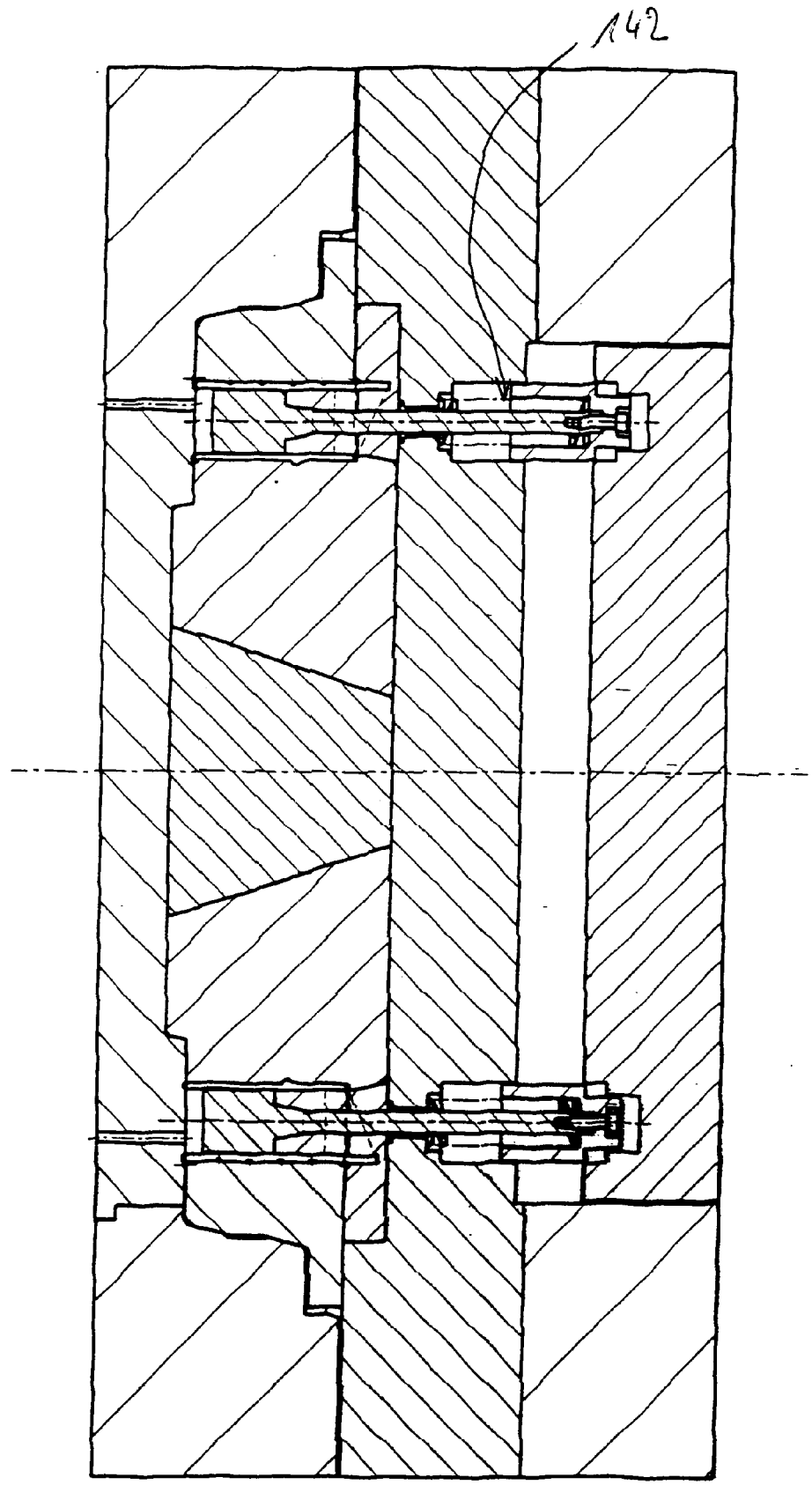
In FIG. 15, a mold according to a fourth embodiment of the invention, installed in an injection press, along a section comparable to that of XX in FIG. 2, in closed position.
Figure 16:
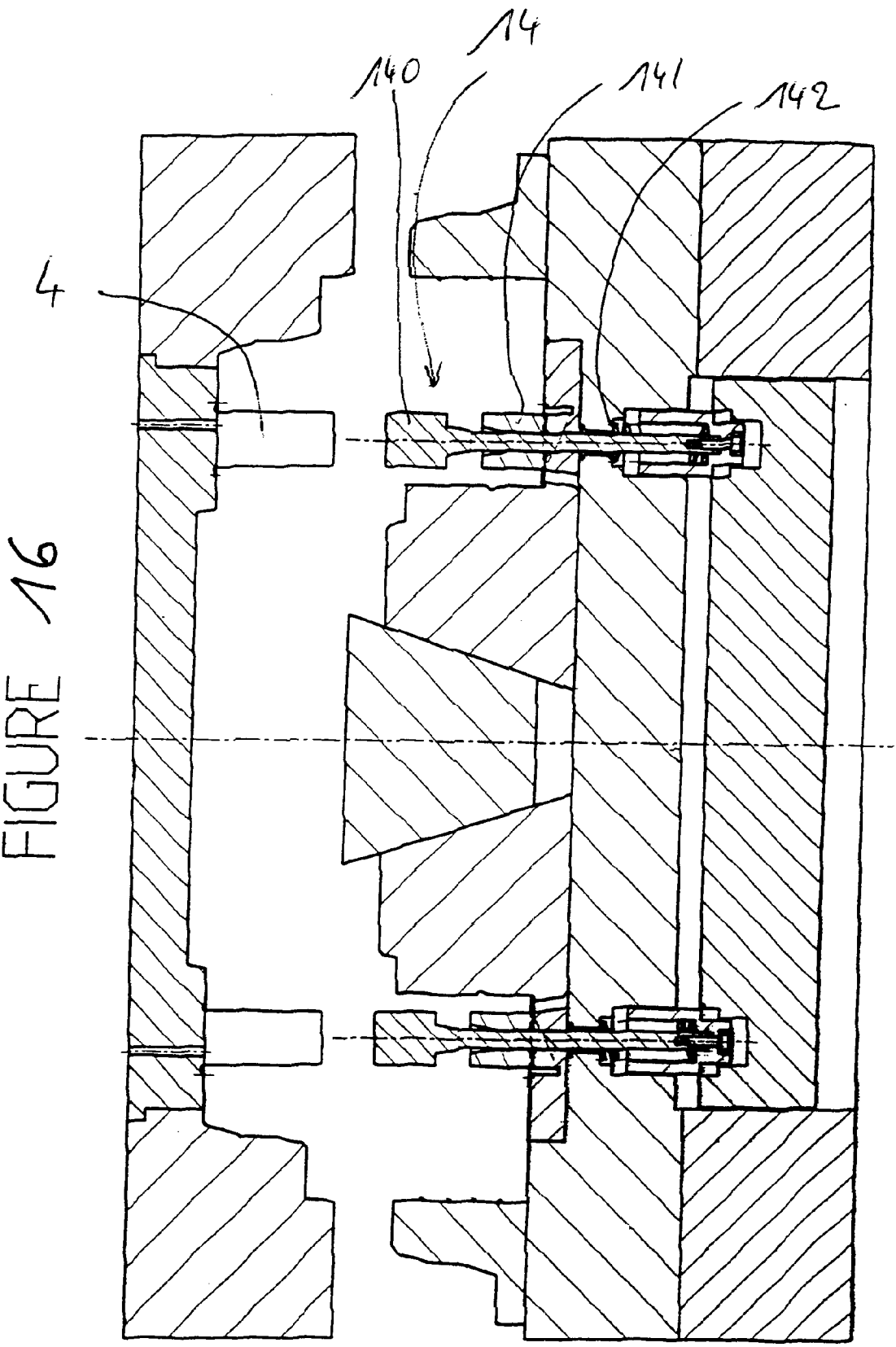
In FIG. 16, the mold according to the fourth embodiment, in open position.

Finally, FIGS. 15 and 16 illustrate a fourth embodiment, this time concerning the molding fingers. This aspect is, of course, compatible with all the other embodiments, the latter proposing different cores. On one of the platens, fingers 4 very similar to what has been described above are encountered. On the other platen, ejector fingers 14 are installed, circumferentially alternating with fingers 4 (see FIG. 16). Some of the fingers 14 are made in two axially separable parts 140 and 141. The end part 140 can be separated from its base 141 in order to favor mold stripping of the support. The deployed position, or ejection position, of FIG. 16 is the natural position and is obtained under the pressure of springs 142. The molding position is obtained by proper operation on closing of the mold and, more precisely, when the platens come together axially.

We claim:

1. A method for manufacturing a support to be mounted on a vehicle rim, said support having an axis of rotation, a base defined by a substantially cylindrical radially inner face designed to be mounted around said rim, a crown designed to support the weight and a body connecting said base to said crown, said base including a substantially inextensible circumferential reinforcement, the radially outer face of said crown having a shape departing from the cylindrical shape, the body having a plurality of axial recesses emerging from said support on at least one side, said method of using a mold having an axis corresponding to said axis of rotation, said mold comprising:

an inner core for the molding the radially inner face, a crown molding ring, said ring having at least two parts radially separable from each other, said separable parts making it possible to mold said radially outer face of said crown, at least one shell containing a plurality of axial fingers for laterally molding said body and said recesses, said core, said ring and said shell cooperating to define, at least partially, a closed cavity for molding said support, said core comprising at least two components and being capable of assuming a molding configuration in which its components form a circumferentially continuous molding surface for molding said radially inner face, the molding surface being defined by a reference diameter Φ corresponding generally to the inner diameter of said support, said core also being capable of taking a mold stripping configuration different from the molding configuration, defined by an overall length E around said molding surface less than the product of π and reference diameter Φ, said method of manufacture comprising the following steps:

prefabricating a ring including said circumferential reinforcement;

establishing the mold stripping configuration of said core;

installing said ring on said core;

establishing the molding configuration of said core;

closing the mold and then force feeding into the mold an injectable material which is elastic in final state;

axially separating said shell containing axial fingers, at least partially, in relation to at least one of the components that include molding ring and the core;

then establishing the mold stripping configuration of said core and radially separating said parts from the crown molding ring;

discharging said support.

2. A method according to claim 1, in which said substantially inextensible circumferential reinforcement includes reinforcing wires oriented in a substantially circumferential direction and embedded in an elastomeric matrix.

3. A method according to claim 1, in which, on establishment of the molding configuration, said ring is stressed in tension.

4. A method according to claim 1, for molding a support containing a plurality of axial recesses, some passing out on one side and the others passing out on the other side of said support, using a mold comprising two shells, each containing a plurality of axial fingers for laterally molding said body and said recesses on both sides of the support, in which each of said shells containing axial fingers is axially separated, at least partially and in relation to the core and to the crown molding ring, before establishing the strip molding configuration of said core and radially separating said parts from the ring.

5. A mold for molding a support to be mounted on a vehicle rim, said support having an axis of rotation, a base having a generally cylindrical radially inner face to be mounted on said rim, a crown to bear the weight and a body connecting said base to said crown, said base including a generally inextensible circumferential reinforcement, said mold having an axis corresponding to said axis of rotation, said mold comprising an inner core for molding the radially inner face, other parts creating a closed cavity with said core for molding said support, said core embodying at least two separable molding parts, one part including a molding sector extending circumferentially from a first edge to a second edge and partially defining the molding surface of said radially inner face, said molding sector engaging at least one other of the at least two molding parts along an interface therebetween, said interface being formed by one or more planar bearing surfaces on said at least one molding part and said at least one other molding part inclined at a first angle relative to the axis of the mold, said at least two molding parts being capable of assuming a molding configuration in which said parts form a circumferentially continuous molding surface, defined by a reference diameter Φ corresponding generally to the inner diameter of said support, and a mold stripping configuration through sliding of one part over another part along said interface, said mold stripping configuration having an overall circumferential length E less than the product of π and the reference diameter Φ, and said at least two molding parts including means for positioning said circumferential reinforcement relative to said circumferential molding surface for proper placement of said circumferential reinforcement within said support during the molding thereof.

6. A mold according to claim 5, in which said core includes at least three separable rigid molding parts and in which the core has a plane of symmetry containing said axis of the mold.

7. A mold according to claim 5, in which said core includes a rigid center part and two rigid complementary parts, said three rigid parts having four adjacent molding sectors, constituting molding surfaces for molding said radially inner face, the center part having two nonadjacent molding sectors, the center part further having two planar bearing surfaces, inclined by angles of the same value and of opposite signs relative to the axis of the mold, cooperating with corresponding planar bearing surfaces arranged on the complementary parts along said interface, so that an axial movement of said center part controls a radial movement of said complementary parts.

8. A mold according to claim 5, in which said core contains a rigid center part and four rigid complementary parts, said four complementary parts having four adjacent molding sectors, constituting molding surfaces for molding the radially inner face, the center part having two planar bearing surfaces, inclined by angles of the same value and of opposite signs relative to the axis of the mold, cooperating with corresponding planar bearing surfaces arranged on two of the complementary parts along said interface, so that an axial movement of said center part controls a radial movement of said two complementary parts.

9. A mold according to claim 5, in which said core includes a rigid center part and four rigid complementary parts, said four complementary parts having four adjacent molding sectors, constituting molding surfaces for molding said radially inner face, the center part having two pairs of planar bearing surfaces, inclined for the first pair by angles +α and −α relative to the axis of the mold, and for the second pair by angles +β and −β relative to the axis of the mold, also opposite and of different value than value α, said planar bearing surfaces cooperating with corresponding planar bearing surfaces arranged on the complementary parts along said interface, so that an axial movement of said center part controls a radial movement of said complementary parts.

10. A mold according to claim 7, in which the molding sectors of at least a plurality of said complementary parts include a plurality of spikes protruding radially.

11. A mold according to claim 5, in which each of the molding sectors has a flange forming a radial projection.

12. A mold according to claim 5, in which said other parts creating a closed cavity with said core comprise a shell provided with axially oriented fingers, the shell molding the lateral portion of said body, said fingers molding recesses in said body, at least a plurality of said fingers including ejector fingers made in two axially separable parts, an end part and a base, the end part being removable from its base in order to facilitate mold stripping of the support.

* * * * *